(12) United States Patent
Rho et al.

(10) Patent No.: US 10,127,302 B2
(45) Date of Patent: Nov. 13, 2018

(54) DATA REDUNDANCY MAXIMIZATION TOOL

(71) Applicant: Pearson Education, Inc., Hudson St., NY (US)

(72) Inventors: Yun Jin Rho, Acton, MA (US); Yueh-Mei Chien, Iowa City, IA (US); Heijung Kim, Arlington, MA (US); Ruth A. Czarnecki-Lichstein, Chicago, IL (US); Alicia L. Anderson, Mathews, NC (US)

(73) Assignee: PEARSON EDUCATION, INC., New York, NY (US)

( * ) Notice: Subject to any disclaimer, the term of this patent is extended or adjusted under 35 U.S.C. 154(b) by 321 days.

(21) Appl. No.: 14/942,990

(22) Filed: Nov. 16, 2015

(65) Prior Publication Data

US 2017/0140024 A1    May 18, 2017

(51) Int. Cl.
*G06F 17/30* (2006.01)

(52) U.S. Cl.
CPC .. *G06F 17/30598* (2013.01); *G06F 17/30545* (2013.01)

(58) Field of Classification Search
CPC ............... G06F 17/30598; G06F 17/30545
See application file for complete search history.

(56) References Cited

U.S. PATENT DOCUMENTS

| 5,937,093 | A | * | 8/1999 | Takahashi | G06K 9/6276 |
| | | | | | 382/195 |
| 2009/0003693 | A1 | * | 1/2009 | Yamamoto | G06T 9/00 |
| | | | | | 382/166 |

* cited by examiner

*Primary Examiner* — Cam-Y Truong
(74) *Attorney, Agent, or Firm* — Kilpatrick Townsend and Stockton LLP

(57) ABSTRACT

Methods and systems for maximizing data utility efficiency to maximize dynamic application of content in a database as applied to a validation are disclosed herein. A system for maximizing data utility efficiency to maximize dynamic application of content in a database as applied to a validation can include a memory having a first database containing information identifying a plurality of topics and a second database containing a plurality of content items. The system can further include a server that can maximize data utility efficiency by identifying multipurpose content items.

18 Claims, 13 Drawing Sheets

DATA REDUNDANCY MAXIMIZATION TOOL

BACKGROUND

This disclosure relates in general to machine learning. Machine learning is a subfield of computer science that evolved from the study of pattern recognition and computational learning theory in artificial intelligence. Machine learning explores the construction and study of algorithms that can learn from and make predictions on data. Such algorithms operate by building a model from example inputs in order to make data-driven predictions or decisions, rather than following strictly static program instructions.

Machine learning is closely related to and often overlaps with computational statistics; a discipline that also specializes in prediction-making. It has strong ties to mathematical optimization, which deliver methods, theory and application domains to the field. Machine learning is employed in a range of computing tasks where designing and programming explicit, rule-based algorithms is infeasible. Example applications include spam filtering, optical character recognition (OCR), search engines and computer vision. Machine learning is sometimes conflated with data mining, although that focuses more on exploratory data analysis. Machine learning and pattern recognition can be viewed as two facets of the same field. When employed in industrial contexts, machine learning methods may be referred to as predictive analytics or predictive modelling.

BRIEF SUMMARY

One aspect of the present disclosure relates to a system for maximizing data utility efficiency to maximize dynamic application of content in a database as applied to a validation. The system can include a memory including a first database containing information identifying a plurality of topics, and a second database containing a plurality of content items. In some embodiments, some or all of the content items are associated with at least one of a plurality of topics, and at least some of the content items are associated with at least two of the plurality of topics. The system can include a server that can be programmed and/or controlled to: receive an identification of a number of topics for grouping in a validation from a user device; determine the number of content items associated with each of at least some of the topics, which determining the number of content items can include querying the second database for information associating one or several content items with the at least some of the topics; receive a cut threshold from the user device, which cut threshold can include data identifying a minimum score and a minimum confidence interval for determining passage with respect to the validation; determine a threshold number, which threshold number identifies the minimum number of content items per topic for determining when the cut threshold is achieved; and select a first one of the at least some of the topics. In some embodiments, the processor can be programmed and/or controlled to compare the number of content items associated with the first one of the at least some of the topics to the threshold number. In some embodiments, comparing the number of content items associated with the first one of the at least some of the topics to the threshold number can include associating a first value with the first one of the at least some of the topics when the number of content items is greater than the threshold number and associating a second value with the first one of the at least some topics when the number of content items is less than the threshold number. In some embodiments, the processor can be programmed and/or controlled to associate remedial content with the selected first one of the at least some of the topics when the second value is associated with the first one of the at least some of the topics.

In some embodiments, the processor can be programmed and/or controlled to iteratively select an additional topic of the at least some of the topics and compare the number of content items associated with the additional topic to the threshold number until the number of content items associated with each of the at least some of the topics has been compared to the threshold number. In some embodiments, associating remedial content with the selected first one of the at least some of the topics includes: identifying topics of the at least some of the topics that are associated with the second value; iteratively selecting a topic from the identified topics of the at least some of the topics that are associated with the second value and identifying at least one potential regrouping for the iteratively selected topic from the identified topics of the at least some of the topics that are associated with the second value; and regrouping the iteratively selected topic from the identified topics with one of the at least one potential regroupings.

In some embodiments, regrouping the iteratively selected topic from the identified topics with at least some of the identified potential regrouping topics includes: determining that the at least one potential regroupings comprises a plurality of regroupings; and iteratively comparing the number of content items associated with one regrouping of the at least one potential regroupings with the threshold number until the number of content items associated with each of the at least one potential regroupings has been compared to the threshold number. In some embodiments, comparing the number of content items associated with one regrouping to the threshold number comprises associating a first value with the one regrouping when the number of content items associated with the one regrouping is greater than the threshold number and associating a second value with the one regrouping when the number of content items associated with the one regrouping is less than the threshold number.

In some embodiments, regrouping the iteratively selected topic from the identified topics with at least some of the identified potential regrouping topics further includes: determining that one of the potential regroupings is associated with the first value; selecting the one of the potential regroupings that is associated with the first value; and providing the selected one of the potential regroupings to the user device. In some embodiments, regrouping the iteratively selected topic from the identified topics with at least some of the identified potential regrouping topics further includes: determining that more than one of the potential regroupings is associated with the first value; identifying at least one of the more than one of the potential regroupings that includes at least one topic associated with the second value; and providing the at least one of the more than one of the potential regroupings that includes at least one topic associated with the second value to the user device.

In some embodiments, regrouping the iteratively selected topic from the identified topics with at least some of the identified potential regrouping topics further includes: determining that none of the potential regroupings is associated with the first value; generating an option list, which option list identifies at least one of: a change to the validation; potential source of a new content item; and a request for new content items; and providing the option list to the user device. In some embodiments, the processor can be programmed and/or controlled to receive a new content item from the user device; and identify topics associated with the new content item. In some embodiments, the system can further include a formatting server that can be programmed and/or controlled to receive a content item from the potential source and convert the format of the content item to a desired format.

One aspect of the present disclosure relates to a method for maximizing data utility efficiency to maximize dynamic application of content in a database as applied to a validation. The method includes receiving an identification of a number of topics for grouping in a validation from a user device; retrieving information from a first database, which information identifies content items associated with each of at least some of the number of topics; determining the number of content items associated with each of at least some of the topics; receiving a cut threshold from the user device, which cut threshold includes data identifying a minimum score and a minimum confidence interval for determining successful completion of the validation; and determining a threshold number, which threshold number identifies the minimum number of content items per topic for determining when the cut threshold is achieved. In some embodiments, the method includes selecting a first one of the at least some of the topics; comparing the number of content items associated with the first one of the at least some of the topics to the threshold number, which comparing of the number of content items associated with the first one of the at least some of the topics to the threshold number can include associating a first value with the first one of the at least some of the topics when the number of content items is greater than the threshold number and associating a second value with the first one of the at least some topics when the number of content items is less than the threshold number; and associating remedial content with the selected first one of the at least some of the topics when the second value is associated with the first one of the at least some of the topics.

In some embodiments, the method includes iteratively selecting an additional topic of the at least some of the topics and comparing the number of content items associated with the additional topic to the threshold number until the number of content items associated with each of the at least some of the topics has been compared to the threshold number. In some embodiments, associating remedial content with the selected first one of the at least some of the topics includes: identifying topics of the at least some of the topics that are associated with the second value; iteratively selecting a topics from the identified topics of the at least some of the topics that are associated with the second value and identifying at least one potential regroupings for the iteratively selected topic from the identified topics of the at least some of the topics that are associated with the second value; and regrouping the iteratively selected topic from the identified topics with one of the at least one potential regroupings.

In some embodiments regrouping the iteratively selected topic from the identified topics with at least some of the identified potential regrouping topics includes: determining that the at least one potential regroupings comprises a plurality of regroupings; and iteratively comparing the number of content items associated with one regrouping of the at least one potential regroupings with the threshold number until the number of content items associated with each of the at least one potential regroupings has been compared to the threshold number, which comparing of the number of content items associated with one regrouping to the threshold number includes associating a first value with the one regrouping when the number of content items associated with the one regrouping is greater than the threshold number and associating a second value with the one regrouping when the number of content items associated with the one regrouping is less than the threshold number.

In some embodiments, regrouping the iteratively selected topic from the identified topics with at least some of the identified potential regrouping topics further includes: determining that one of the potential regroupings is associated with the first value; selecting the one of the potential regroupings that is associated with the first value; and providing the selected one of the potential regroupings to the user device. In some embodiments, regrouping the iteratively selected topic from the identified topics with at least some of the identified potential regrouping topics further includes: determining that more than one of the potential regroupings is associated with the first value; identifying at least one of the more than one of the potential regroupings that includes at least one topic associated with the second value; and providing the at least one of the more than one of the potential regroupings that includes at least one topic associated with the second value to the user device.

In some embodiments, regrouping the iteratively selected topic from the identified topics with at least some of the identified potential regrouping topics further includes: determining that none of the potential regroupings is associated with the first value; generating an option list, which option list identifies at least one of: a change to the validation; potential source of a new content item; and a request for new content items; and providing the option list to the user device. In some embodiments, the method further includes receiving a new content item from the user device; and identifying topics associated with the new content item. In some embodiments, the method further includes receiving a content item with a formatting server from the potential source; and converting the format of the content item to a desired format.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
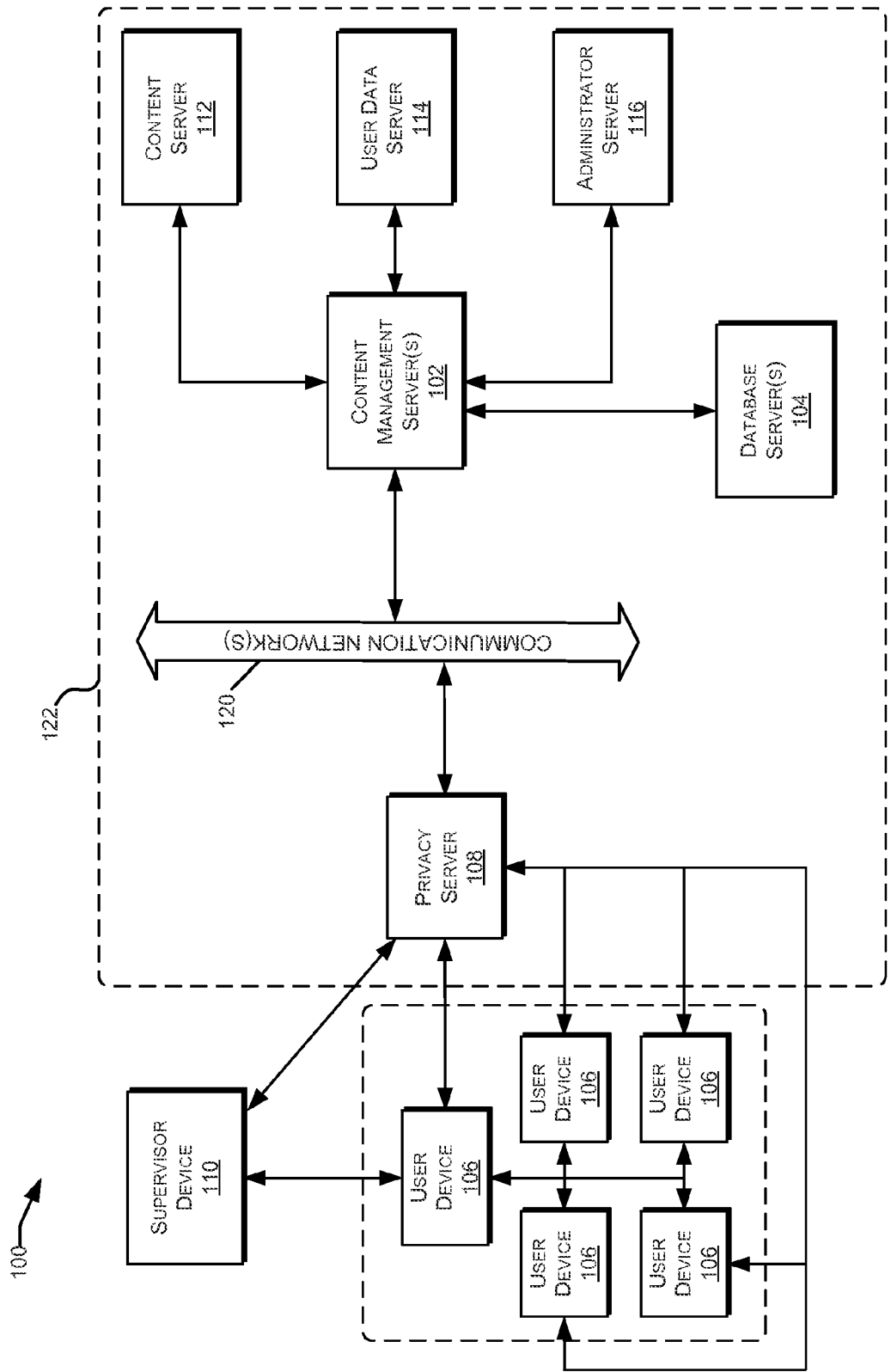
FIG. 1 is a block diagram illustrating an example of a data extraction and analysis system.

With reference now to FIG. 1, a block diagram is shown illustrating various components of a content delivery network 100, also referred to herein as a data redundancy maximization tool, which implements and supports certain embodiments and features described herein. The content delivery network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content delivery network 100 may include one or more databases servers 104, also referred to herein as databases. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatively connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Databases 104 may comprise stored data relevant to the functions of the content delivery network 100. Illustrative examples of databases 104 that may be maintained in certain embodiments of the content delivery network 100 are described below in reference to FIG. 3. In some embodiments, multiple databases may reside on a single database server 104, either using the same storage components of server 104 or using different physical storage components to assure data security and integrity between databases. In other embodiments, each database may have a separate dedicated database server 104.

The content delivery network 100 also may include one or more user devices 106 and/or supervisor devices 110. User devices 106 and supervisor devices 110 may display content received via the content delivery network 100, and may support various types of user interactions with the content. In some embodiments, the user devices 106 and the supervisor devices 110 can be configured to access data in, edit data in, retrieve data from, and/or provide data to the data extraction and analysis system.

User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120. In some embodiments, the designated role of a device, including a user device 106 or a supervisor device 110 can vary based on the identity of the user using that device. Thus, in some embodiments, both user and supervisor devices 106, 110 can include the same hardware, but can be configured as one of a user device 106 or a supervisor device 110 at the time of log-in by a user to use that device.

In different contexts of data extraction and analysis systems 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location, such as a classroom, a clinic, or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content delivery network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in data extraction and analysis systems 100 used for professional training and educational purposes, content server 112 may include databases of training materials, presentations, plans, syllabi, reviews, evaluations, interactive programs and simulations, course models, course outlines, and various training interfaces that correspond to different materials and/or different types of user devices 106. In data extraction and analysis systems 100 used for media distribution, interactive gaming, and the like, a content server 112 may include media content files such as music, movies, television programming, games, and advertisements. In some embodiments, the one or several content servers 112 can be in communicating connection with the content management server 102 via, for example, the internet or other communication network.

In some embodiments, the content delivery network 100 can include a plurality of content servers 112 that can contain the same or different content. In some embodiments, this plurality of content servers 112 can be controlled as a part of the content delivery network 100, and in some embodiments, this plurality of content servers 112 can be controlled independent of the content delivery network 100. In such an embodiments, data can be transferred to and/or from one or several of the plurality of content servers 112 and some or all of the other components of the content delivery network 100.

In one embodiment, for example, the content delivery network 100 can include a first content server, a second content server, a third content server, and/or a fourth content server. In some embodiments, for example, some or all of the first, second, third, and fourth content servers can host websites, which can be unique. These websites can contain information that can be retrieved and/or used by some or all of the other components of the content delivery network 100. In some embodiments, the first content server can be configured to host and/or can host a first website containing a first portion of species data, the second content server can be configured to host and/or can host a second portion of species data, the third content server can be configured to host and/or can host a first portion of qualitative data, and/or the fourth content server can be configured to host and/or can host a second portion of qualitative data.

User data server 114 may include hardware and software components that store and process data for multiple users relating to each user's activities and usage of the content delivery network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users.

In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content delivery network 100. For example, the administrator server 116 may monitor device status and performance for the various servers, databases, and/or user devices 106 in the content delivery network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content delivery network 100 may include one or more communication networks 120. Although only a single network 120 is identified in FIG. 1, the content delivery network 100 may include any number of different communication networks between any of the computer servers and devices shown in FIG. 1 and/or other devices described herein. Communication networks 120 may enable communication between the various computing devices, servers, and other components of the content delivery network 100. As discussed below, various implementations of data extraction and analysis systems 100 may employ different types of networks 120, for example, computer networks, telecommunications networks, wireless networks, and/or any combination of these and/or other networks.

In some embodiments, some of the components of the content delivery network 100 can belong to the content network 122. The content network 122 can include, for example, the content management server 102, the database server 104, the privacy server 108, the content server 112, the user data server 114, the administrator server 116, and/or the communication network 120. The content network 122 can be the source of content distributed by the content delivery network 100, which content can include, for example, one or several documents and/or applications or programs. These documents and/or applications or programs are digital content. In some embodiments, these one or several documents and/or applications or programs can include, for example, one or several webpages, presentations, papers, videos, charts, graphs, books, written work, figures, images, graphics, recordings, applets, scripts, or the like.

Figure 2:
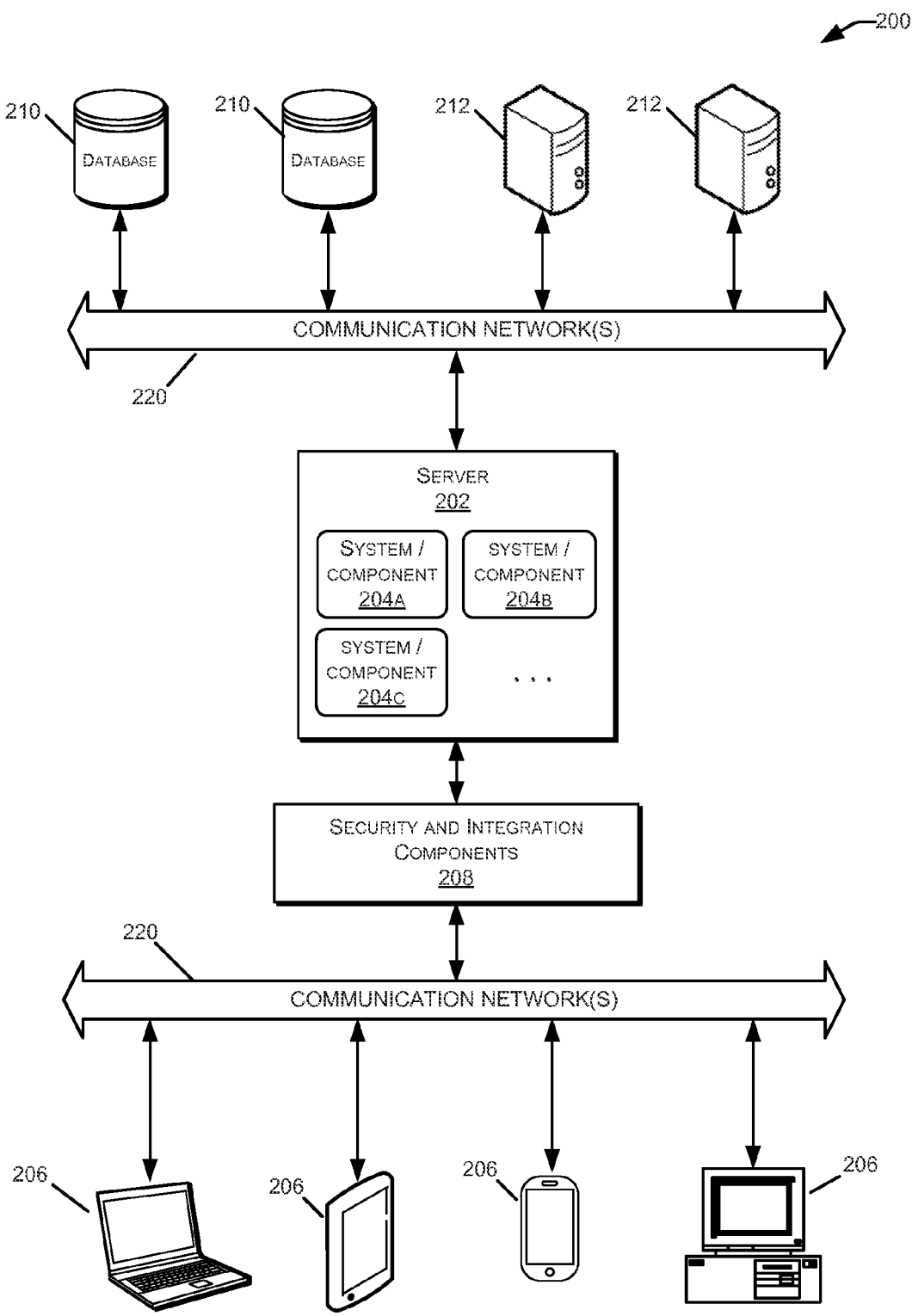
FIG. 2 is a block diagram illustrating a computer server and computing environment within a data extraction and analysis system.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and data extraction and analysis systems 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content delivery network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content delivery network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more databases 210 and/or back-end servers 212. In certain examples, the databases 210 may correspond to database server(s) 104, the local data server 109, and/or the customizer data server 128 discussed above in FIG. 1, and back-end servers 212 may correspond to the various back-end servers 112-116. Databases 210 and servers 212 may reside in the same datacenter or may operate at a remote location from server 202. In some cases, one or more databases 210 may reside on a non-transitory storage medium within the server 202. Other databases 210 and back-end servers 212 may be remote from server 202 and configured to communicate with server 202 via one or more networks 220. In certain embodiments, databases 210 and back-end servers 212 may reside in a storage-area network (SAN). In some embodiments, the computing environment can be replicated for each of the networks 105, 122, 104 discussed with respect to FIG. 1 above.

Figure 3:
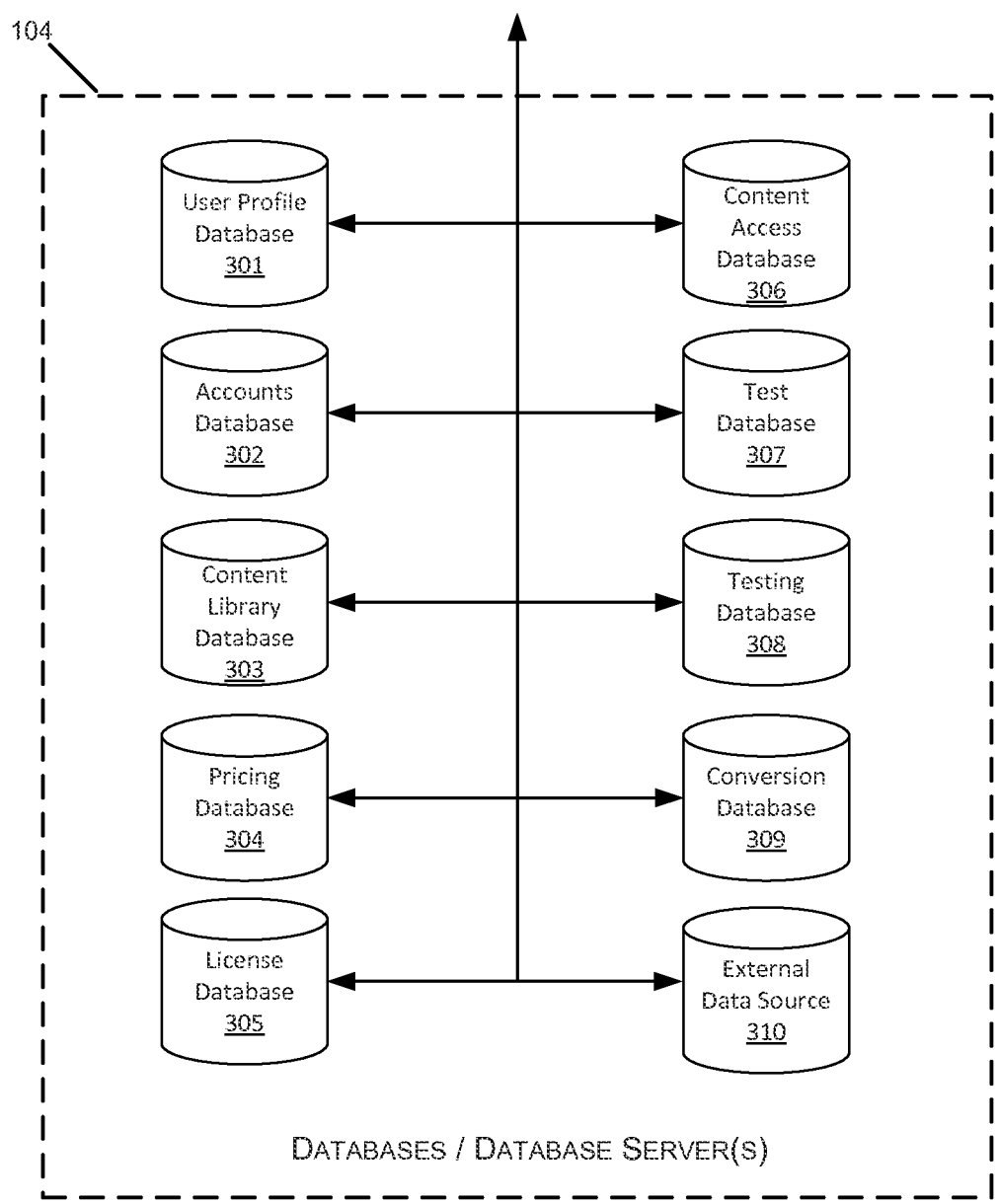
FIG. 3 is a block diagram illustrating an embodiment of one or more database servers within a data extraction and analysis system.

With reference to FIG. 3, an illustrative set of databases and/or database servers is shown, corresponding to the databases servers 104 of the content delivery network 100 discussed above in FIG. 1. One or more individual databases 301-310 may reside in storage on a single computer server 104 (or a single server farm or cluster) under the control of a single entity, or may reside on separate servers operated by different entities and/or at remote locations. In some embodiments, databases 301-310 may be accessed by the content management server 102 and/or other devices and servers within the network 100 (e.g., user devices 106, supervisor devices 110, administrator servers 116, etc.). Access to one or more of the databases 301-310 may be limited or denied based on the processes, user credentials, and/or devices attempting to interact with the database.

The paragraphs below describe examples of specific databases that may be implemented within some embodiments of a content delivery network 100. It should be understood that the below descriptions of databases 301-310, including their functionality and types of data stored therein, are illustrative and non-limiting. Database server architecture, design, and the execution of specific databases 301-310 may depend on the context, size, and functional requirements of a content delivery network 100. For example, in content distribution systems 100 used for professional training and educational purposes, separate databases may be implemented in database server(s) 104 to store trainee and/or student data, trainer and/or professor data, training module data and content descriptions, training results, evaluation data, and the like. In contrast, in content distribution systems 100 used for media distribution from content providers to subscribers, separate databases may be implemented in database server(s) 104 to store listings of available content titles and descriptions, content title usage statistics, subscriber profiles, account data, payment data, network usage statistics, etc.

A user profile database 301 may include information relating to the end users within the content delivery network 100. Generally speaking the user profile database 301 can be a database having restrictions on access, which restrictions can relate to whether one or several users or categories of users are enabled to perform one or several actions on the database or on data stored in the database. In some embodiments, the user profile database 301 can include any information for which access is restricted. This information may include user characteristics such as the user names, access credentials (e.g., logins and passwords), user preferences, and information relating to any previous user interactions within the content delivery network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts database 302 may generate and store account data for different users in various roles within the content delivery network 100. For example, accounts may be created in an accounts database 302 for individual end users, supervisors, administrator users, and entities such as companies or educational institutions. Account data may include account types, current account status, account characteristics, and any parameters, limits, restrictions associated with the accounts.

A content library database 303 may include information describing the individual content items (or content resources) available via the content delivery network 100. In some embodiments, the library database 303 may include metadata, properties, and other characteristics associated with the content resources stored in the content server 112. In some embodiments, this data can include the one or several items that can include one or several documents and/or one or several applications or programs. In some embodiments, the one or several items can include, for example, one or several webpages, presentations, papers, videos, charts, graphs, books, written work, figures, images, graphics, recordings, or any other document, or any desired software or application or component thereof including, for example, a graphical user interface (GUI), all or portions of a Learning Management System (LMS), all or portions of a Content Management System (CMS), all or portions of a Student Information Systems (SIS), or the like.

In some embodiments, the content library database 303 can include a plurality of content items for presentation in one or several validations. These content items, also referred to herein as questions, can be any desired type of question including, for example, multiple choice questions, true/false questions, essay questions, short-answer questions, oral questions, demonstration questions, or the like. Some or all of the content items can be associated with data that can be used in sorting the content items, in selecting one or several content items, and/or in the evaluation of one or several content items. This data can include, for example, data identifying topics relevant to the content items. These topics can identify, for example, competencies demonstrated by the student in correctly responding to and/or answering the questions, and/or potentially lacking competencies demonstrated by the student in incorrectly responding to and/or answering the content items. In some embodiments, a content item can be associated with a single topic, and in some embodiments, a content item can be associated with multiple topics. Thus, in some embodiments, the correct answering of a single content item may be indicative of a number of competencies, and the incorrect answering of a single content item may be indicative of a number of incompetencies. In some embodiments, the content library database 303 can further include a database of topics. This database of topics can include some or all of the topics associated with content items. In some embodiments, the content library database 303 can be configured such that content items associated with a topic can be provided in response to a query for the same, and likewise such that topics associated with a content item can be provided in response to a query for the same.

In some embodiments, the data in the content library database 303 may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library database 303 may be configured to allow updating of content metadata or properties, and to allow the addition and/or removal of information relating to the content resources. In some embodiments, the content library database 303 can be organized such that content is associated with one or several courses and/or programs in which the content is used and/or provided. In some embodiments, the content library database 303 can further include one or several teaching materials used in the course, a syllabus, one or several practice problems, one or several tests, one or several quizzes, one or several assignments, or the like. All or portions of the content library database can be stored in a tier of memory that is not the fastest memory in the content delivery network 100.

A pricing database 304 may include pricing information and/or pricing structures for determining payment amounts for providing access to the content delivery network 100 and/or the individual content resources within the network 100. In some cases, pricing may be determined based on a user's access to the content delivery network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users and the desired level of access (e.g., duration of access, network speed, etc.). Additionally, the pricing database 304 may include information relating to compilation pricing for groups of content resources, such as group prices and/or price structures for groupings of resources.

A license database 305 may include information relating to licenses and/or licensing of the content resources within the content delivery network 100. For example, the license database 305 may identify licenses and licensing terms for individual content resources and/or compilations of content resources in the content server 112, the rights holders for the content resources, and/or common or large-scale right holder information such as contact information for rights holders of content not included in the content server 112.

A content access database 306 may include access rights and security information for the content delivery network 100 and specific content resources. For example, the content access database 306 may include login information (e.g., user identifiers, logins, passwords, etc.) that can be verified during user login attempts to the network 100. The content access database 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A validation database 307, also referred to herein as a test database, can include information relating to one or several validations, also referred to herein as tests. In some embodiments, these one or several validations can be, for example, one or several completed validations, one or several planned validations, and/or one or several in progress validations. Specifically, this information relating to the one or several validations can identify the content, such as the questions for presentation in the one or several validations, identify the mode of presentation of the content, specify the mode of evaluation of the user inputs received in response to the test content, and specify the requirement for passing all or portions of the validation.

In some embodiments, the validation database can include information for one or several validations that can be, for example, created by one or several users including one or several instructors. In some embodiments, for example, a user such as an instructor can create a validation in the validation database 307 by selecting one or several topics to evaluate in the validation. This selection can include, for example, selecting one or several subjects and then selecting one or several topics from within the one or several subjects. Information identifying the one or several subjects and the one or several topics can be stored within the validation database 307.

Additionally, in some embodiments, the creation of a validation in the validation database 307 can further include providing information to the content delivery system 100 such as, for example, information identifying competency threshold levels to pass the validation and/or to pass one or several topics covered by the validation. In some embodiments, this information identifying the competency thresholds can be stored in the validation database 307.

Additionally, the validation database 307 can include information defining the length of the validation such as, for example, the minimum number of questions that can be presented in the validation, a maximum number of questions that can be presented in the validation, or the like. In some embodiments, the validation database 307 can include information that defines a statistical measure of completeness of the validation. This information can be, for example, one or several acceptable error ranges and/or error rates, acceptable levels of uncertainty in the validation results, statistical significance thresholds, or the like.

A validating database 308, also referred to herein as a testing database can include information relating to one or several validations, which one or several validations can be, for example, one or several completed validations, one or several planned validations, and/or one or several in progress validations. In some embodiments, the validating database 308 can receive information from one or several test takers, also referred to herein as participants as the one or several participants are taking the one or several validations. This information can be updated in real time to create an accurate record of the one or several test takers' progress through the one or several validations. In some embodiments, and to facilitate the desired speed with which the validating database 308 is updated, the validating database 308, or a copy thereof, can be stored in the relatively fasters tiers of memory such as, for example, the Tier 0 and/or Tier 1 memory. In some embodiments, the validating database 308 or a copy thereof can be stored locally on the one or several devices used by the one or several participants to take the validation and/or on one or several computing resources locally networked with those one or several devices. In some embodiments, information within the validating database 308 can be used to identify one or several competencies of one or several participants and/or to identify one or several deficiencies of the one or several participants. In some embodiments, these identified one or several competencies and/or deficiencies can be used to determine when and/or whether the one or several participants have completed and/or passed the one or several validations, and in some embodiments, these identified one or several competencies and/or deficiencies can be used to identify one or several next content items to provide to the one or several participants.

A conversion database 309 can include information that can be used in converting from one score type to another. In some embodiments, for example, the output of the one or several validations can be a score, such as, for example, an Item Response Theory ("IRT") score. To increase user friendliness of the validation output, in some embodiments, this IRT score can be converted to a more common and/or relatable score or scoring standard. In such embodiments, the conversion database 309 can include information used in converting the output score to the desired score and/or score format.

In addition to the illustrative databases described above, database server(s) 104 may include one or more external data aggregators 310. External data aggregators 310 may include third-party data sources accessible to the content management network 100, but not maintained by the content management network 100. External data aggregators 310 may include any electronic information source relating to the users, content resources, or applications of the content delivery network 100. For example, external data aggregators 310 may be third-party databases containing demographic data, education related data, consumer sales data, health related data, and the like. Illustrative external data aggregators 310 may include, for example, social networking web servers, public records databases, learning management systems, educational institution servers, business servers, consumer sales databases, medical record databases, etc. Data retrieved from various external data aggregators 310 may be used to verify and update user account information, suggest user content, and perform user and content evaluations.

Figure 4:
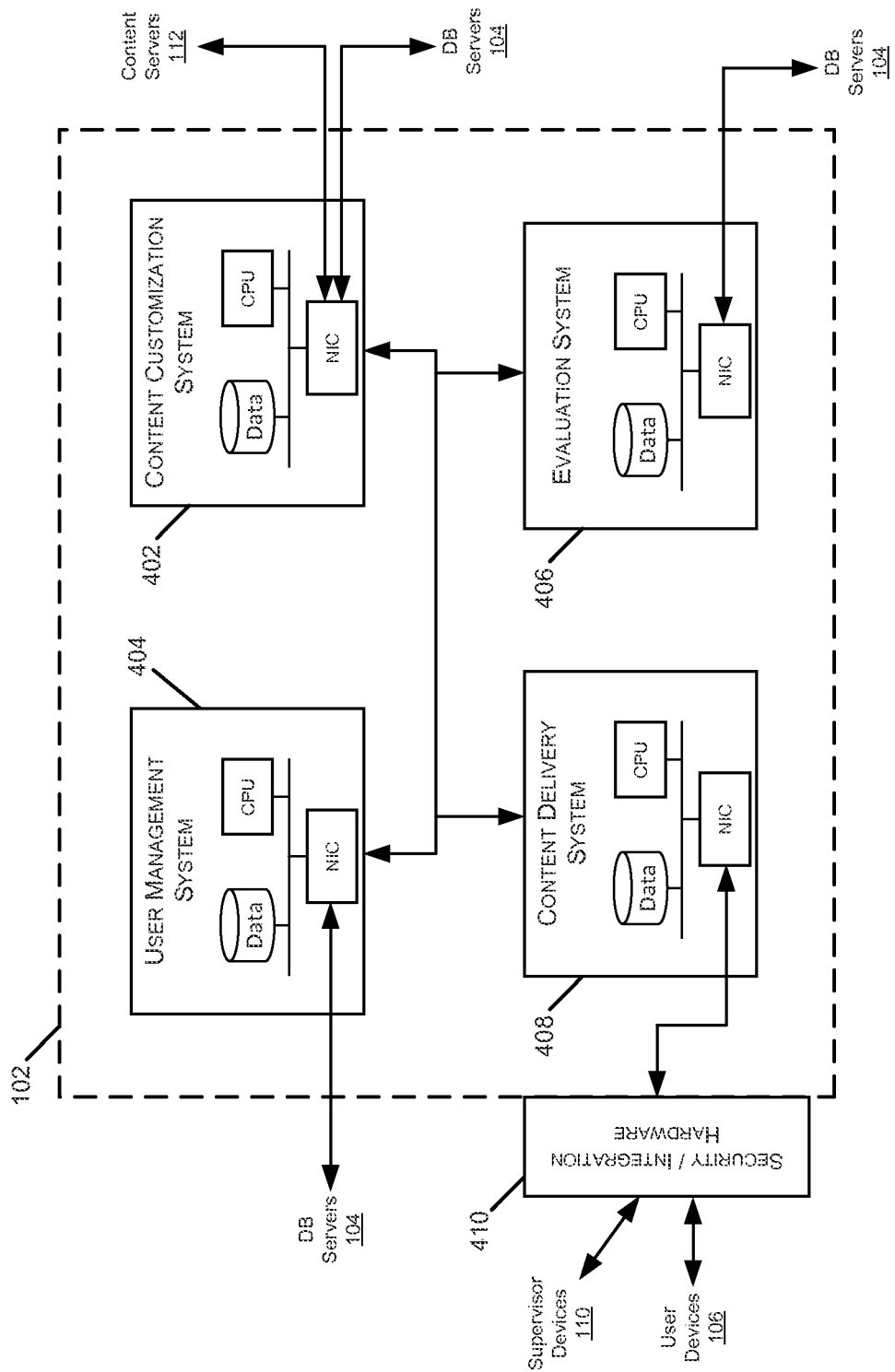
FIG. 4 is a block diagram illustrating an embodiment of one or more content management servers within a data extraction and analysis system.

With reference now to FIG. 4, a block diagram is shown illustrating an embodiment of one or more content management servers 102 within a content delivery network 100. As discussed above, content management server(s) 102 may include various server hardware and software components that manage the content resources within the content delivery network 100 and provide interactive and adaptive content to users on various user devices 106. For example, content management server(s) 102 may provide instructions to and receive information from the other devices within the content delivery network 100, in order to manage and transmit content resources, user data, and server or client applications executing within the network 100.

A content management server 102 may include a content customization system 402. The content customization system 402 may be implemented using dedicated hardware within the content delivery network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various databases and servers 104 to retrieve user information, such as user preferences and characteristics (e.g., from a user profile database 301), user access restrictions to content recourses (e.g., from a content access database 306), and the like. Based on the retrieved information from databases 104 and other data sources, the content customization system 402 may modify content resources for individual users.

A content management server 102 also may include a user management system 404. The user management system 404 may be implemented using dedicated hardware within the content delivery network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and servers 104 to retrieve user data such as associated content compilations or programs, content completion status, user goals, results, and the like.

A content management server 102 also may include an evaluation system 406. The evaluation system 406 may be implemented using dedicated hardware within the content delivery network 100 (e.g., an evaluation server 406), or using designated hardware and software resources within a shared content management server 102. The evaluation system 406 may be configured to receive and analyze information from user devices 106 via, for example, the end-user server 107. For example, various ratings of content resources submitted by users may be compiled and analyzed, and then stored in a database (e.g., a content library database 303) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content delivery network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
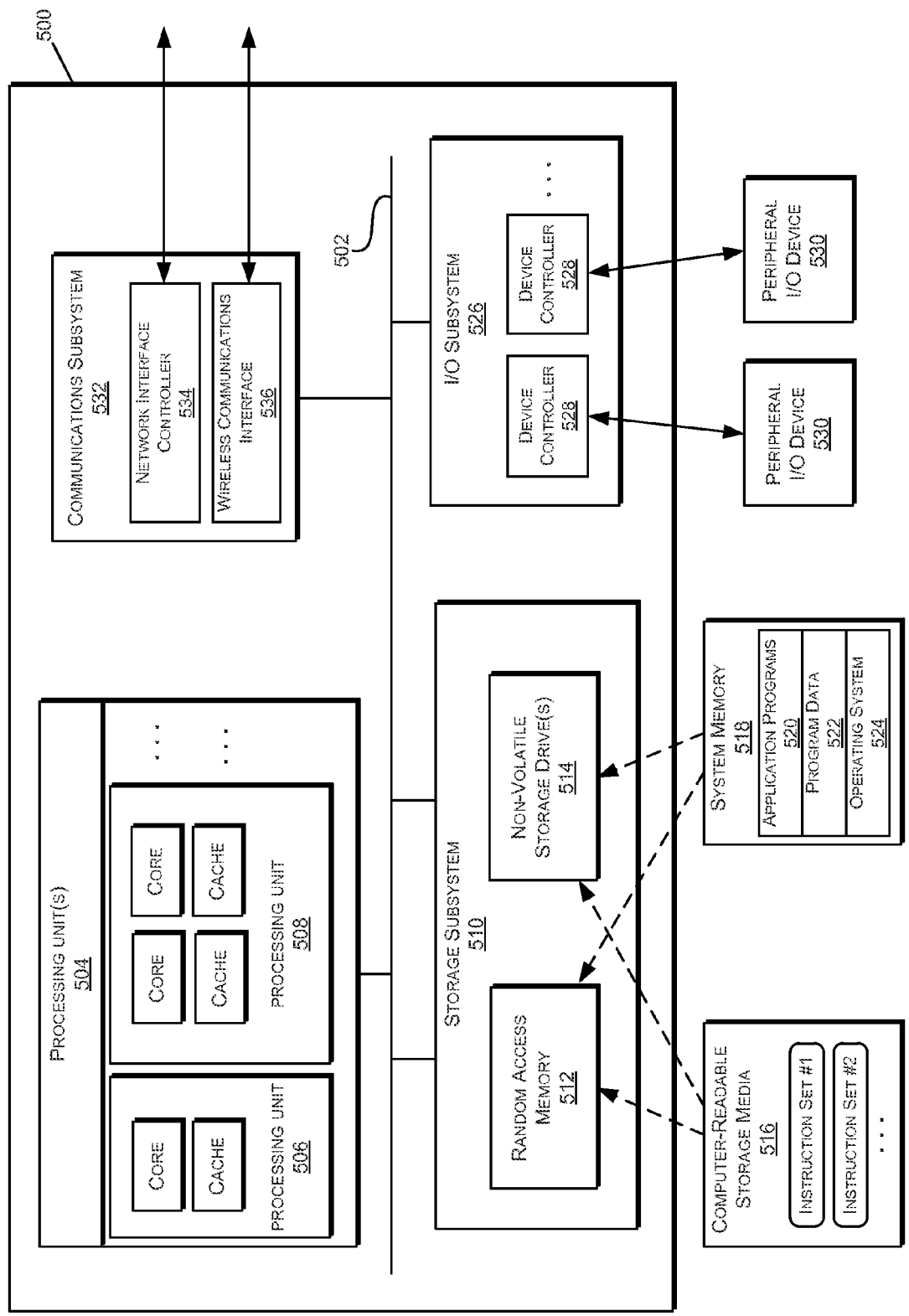
FIG. 5 is a block diagram illustrating the physical and logical components of a special-purpose computer device within a data extraction and analysis system.

With reference now to FIG. 5, a block diagram of an illustrative computer system is shown. The system 500 may correspond to any of the computing devices or servers of the content delivery network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more databases 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
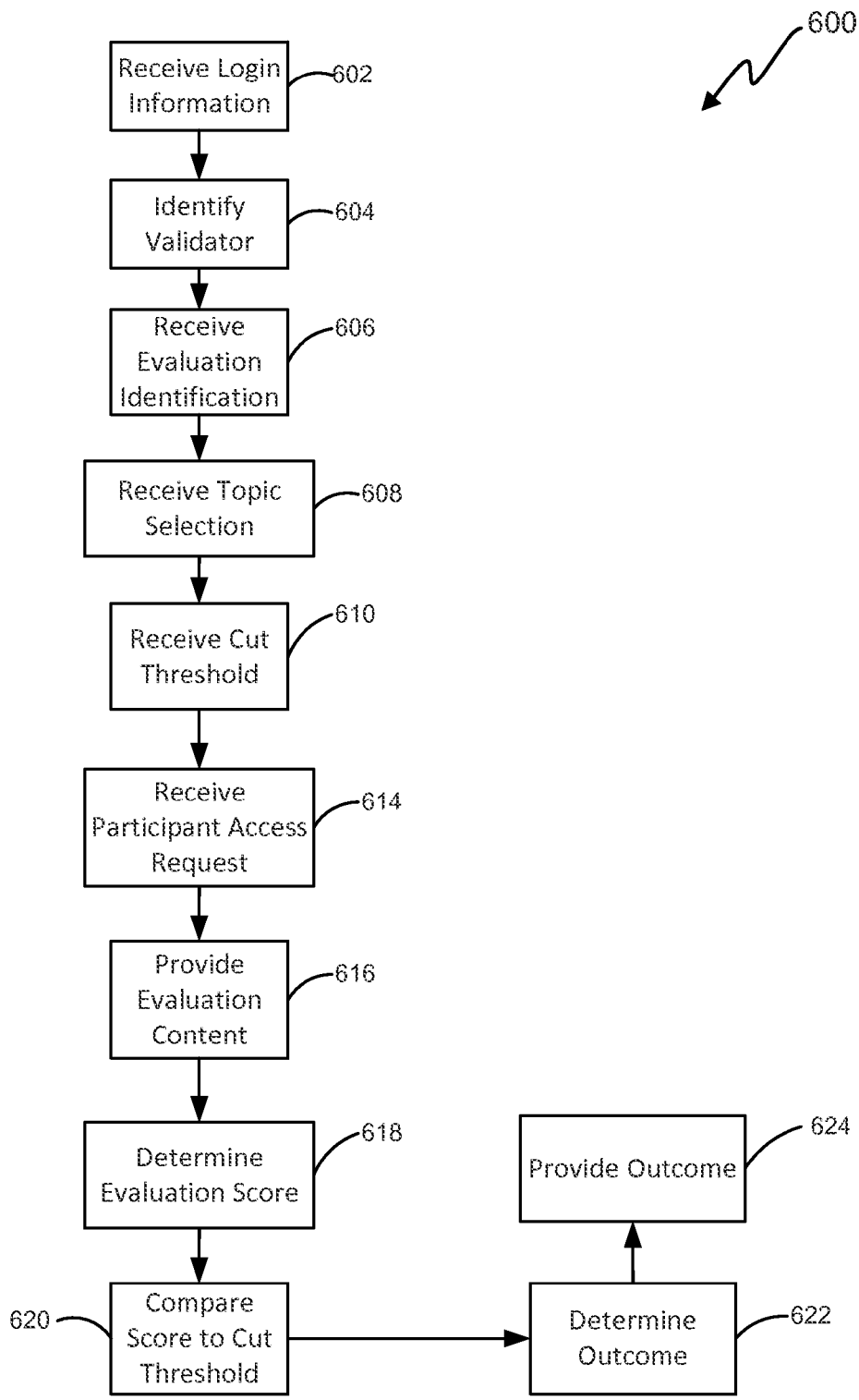
FIG. 6 is a flowchart illustrating one embodiment of a process to maximize data utility efficiency to maximize dynamic application of content in a database as applied to a validation.

With reference now to FIG. 6, a flowchart illustrating one embodiment of a process 600 to maximize data utility efficiency to maximize dynamic application of content in a database as applied to a validation is shown. The process 600 can be performed using some or all of the components of the content delivery network 100 discussed above. The process 600 begins at block 602, wherein login information is received. In some embodiments, this login information can include, for example, a username, a password, a user identifier, or the like. The login information can be received by the content management server 102 either directly from a user device 106 in response to a user input to the user device 106 or indirectly via one or several other components of the content delivery network.

After the login information has been received, the process 600 proceeds to block 604, wherein the validator is identified. In some embodiments, the validator can be the user who is the designer and/or the creator of the validation, also referred to herein as an evaluation and/or a test. The validator can be an individual tasked with ascertaining a skill level, knowledge level, competency level, or the like. The validator can be identified based on the login information received in block 602. In some embodiments, the identification of the validator can further include determining an access level of the validator such as, for example, the degree to which the validator can access and/or edit content in or accessible via the content distribution network 100.

After the validator has been identified, the process 600 proceeds to block 606, wherein an validation identification is received. In some embodiments, the validation identification can include any information identifying a validation such as, for example, the name or a validation. In some embodiments, the receipt of the validation information can further include the receipt of information used to create the validation. The validation information can be received from the validator via the user device 106 by the content management server 102.

After the validation identification information has been received, the process 600 proceeds to block 608, wherein a topic selection is received. In some embodiments, the receipt of the topic selection can include the receipt of information identifying one or several topics for inclusion within the validation. The topic information can be received from the validator via the user device 106 by the content management server 102.

After the topic selection has been received, the process 600 proceeds to block 610, wherein a cut threshold is received. In some embodiments, the cut threshold can include information used to determine when a evaluate, also referred to herein as a testee, a participant, a test taker, a student, a trainee, a learner, or the like, has demonstrated sufficient mastery and/or knowledge to pass the validation. In some embodiments, the cut threshold can identify, for example, a score, a minimum percent correct, a maximum percent incorrect, a maximum number of improperly responded to content items, or the like. In some embodiments, the cut threshold can further include one or several statistical measures to quantify acceptable and/or unacceptable levels of uncertainty in a score. In some embodiments, this can include, for example, one or several confidence scores, one or several confidence intervals such as a minimum confidence interval and/or a maximum confidence interval, or the like. The cut threshold can be received from the validator via the user device 106 by the content management server 102, and can be stored in one of the databases 104 such as, for example, the validating database 308.

After the cut threshold has been received, the process 600 proceeds to block 614, wherein a participant access request is received. In some embodiments, the participant access request can include information identifying one or several participants. This information can include, for example, a username and/or a password. In some embodiments, this information can be used to identify one or several participants and/or for identifying and/or selecting one or several validations for providing to the identified one or several participants. In some embodiments, the participant access request can be received by a user device 106 operated by the participant.

After the participant access request has been received, the process 600 proceeds to block 616 wherein the validation content is provided to the participant. In some embodiments, this can include selecting the validation for providing to the participant and selecting content of that validation for providing to the participant. In some embodiments, and to facilitate the speed with which the validation can be provided to the participant, the providing of the validation content can further include storing all or portions of the validation content in a higher speed tier of the memory such as, for example, the tier 1 or tier 0 memory.

The validation content can be provided to the participant according to some or all of the steps or processes discussed below. In some embodiment, the validation content can be provided by the content management server 102 to the participant via the user device 106.

After the evaluation content has been provided, the process 600 proceeds to block 618, wherein an evaluation score, also referred to herein as a validation score, is determined. In some embodiments, this can include receiving one or several user inputs in response to the content of the validation, and determining the accuracy and/or quality of those one or several user inputs. In some embodiments, the validation score can be generated according to, for example, Item Response Theory (IRT), and the score can be an IRT score.

After the score has been determined, the process 600 proceeds to block 620, wherein the scored is compared to the cut threshold. After the score has been compared to the cut threshold, the process 600 proceeds to block 622, wherein the outcome of the validation is determined. In some embodiments, this outcome can include the participant passing the validation, failing the validation, or an inconclusive outcome. After the outcome has been determined, the process 600 proceeds to block 624, wherein the outcome is provided to a user such as, for example, the participant and/or the validator.

Figure 7:
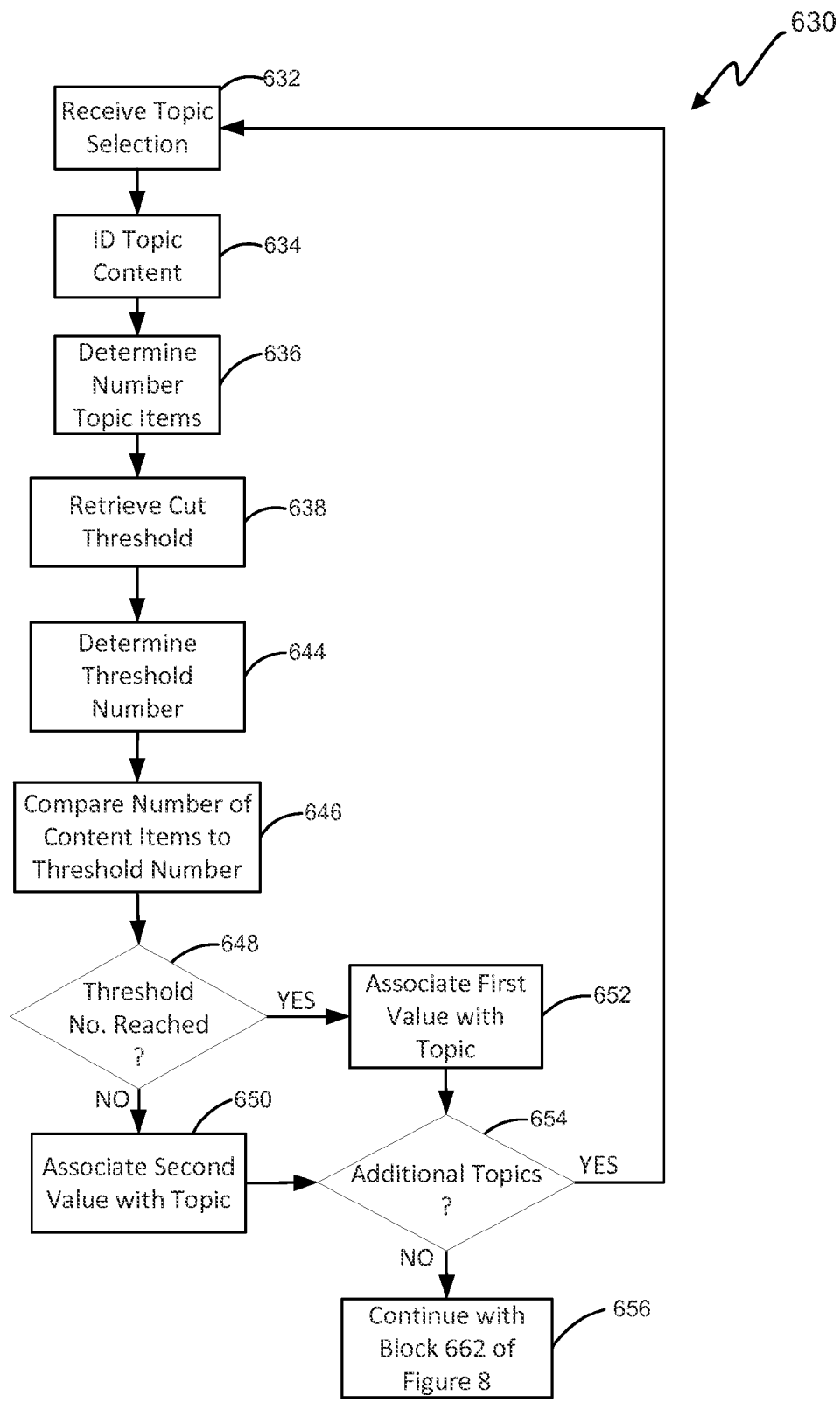
FIG. 7 is a flowchart illustrating a first portion of a process for maximizing data use efficiency.

With reference now to FIG. 7, a flowchart illustrating a first portion of a process 630 for maximizing data use efficiency is shown. The process 630 begins at block 632 wherein a topic selection is received. The topic selection can, like in block 608 of FIG. 6, be received from the validator via the user device 106. After the topic selection has been received, the process 630 proceeds to block 634 wherein topic content is identified. In some embodiments, this can include identifying one or several content items associated with the received topic. These one or several content items can be identified as associated with the received topic by, for example, querying one of the databases 104, and specifically in the content library database 303. As discussed above, the content library database 303 can include information identifying a plurality of content items and/or one or several topics associated with each of some or all of the content items. In such an embodiment, querying the content library database 303 by topic can result in an output of content items associated with that topic.

After the topic content has been identified, the process 630 proceeds to block 636 wherein the number of content items associated with a topic, and specifically with the topic selection received in block 632 is determined. In some embodiments, this determination can be made by incrementing an account for each content item discovered as associated with the topic. In some embodiments, the determined number of content items associated with the topic can be stored in one of the databases 104 such as the content library database 303.

After the number of content items associated with the topic has been determined, the process 630 proceeds to block 638 wherein a cut threshold is retrieved. In some embodiments, the step of block 638 can correspond to the step of block 610 of FIG. 6, and in some embodiments, the cut threshold, which was previously received from a user device 106 and stored in one of the databases 104 can be retrieved from that database 104.

After the cut threshold has been retrieved, the process 630 proceeds to block 644 wherein a threshold number is determined. In some embodiments, the threshold number can identify a minimum number of content items associated with the topic to meet the requirements of the cut threshold. In some embodiments, this minimum number can be calculated based on the one or several statistical measures of confidence associated with the cut threshold such as, for example, the confidence interval. In some embodiments, the threshold number can be a multiple of the minimum number of content items to meet the cut threshold to provide for the possibility of inconsistent responses to the content items such as, for example, both correct and incorrect responses to content items associated with the topic. In some embodiments, for example, the threshold number can be 1.5 times, 2 times, 2.5 times, 3 times, 4 times, 5 times, and/or any other intermediate number of times larger than the minimum number of content items to meet the cut threshold.

After the threshold number has been identified, the process 630 proceeds to block 646 wherein the number of content items associated with the topic are compared to the threshold number. In some embodiments, this comparison can include determining whether the number of content items associated with the topic is greater than, less than, or equal to the threshold number.

After the number of content items associated with the topic has been compared to the threshold number, the process 630 proceeds to decision state 648 wherein it is determined if the threshold number has been reached. If the threshold has not been reached, then the process 630 proceeds to block 650, wherein a second value such as, for example, a second Boolean value is associated with the topic. In some embodiments, the threshold number has not been reached when the number of content items associated with that topic is less than the threshold number or alternatively is less than or equal to the threshold number. Alternatively, if it is determined that the threshold has been reached, then the process 630 proceeds to block 652, wherein a first value, such as a first Boolean value is associated with the topic. In some embodiments, the threshold number has been reached when the number of content items associated with that topic is greater than the threshold number or alternatively is greater than or equal to the threshold number.

After one of the first or second values has been associated with the topic, the process 630 proceeds to decision state 654, wherein it is determined if there are additional topics associated with the validation that have not yet evaluated with respect to the threshold number. If it is determined that there are additional, unevaluated topics, then the process 630 returns to block 632 and proceeds outlined above. Alternatively, if it is determined that there are no additional, unevaluated topics, and the process 630 proceeds to block 656 and continues with block 662 of FIG. 8.

Figure 8:
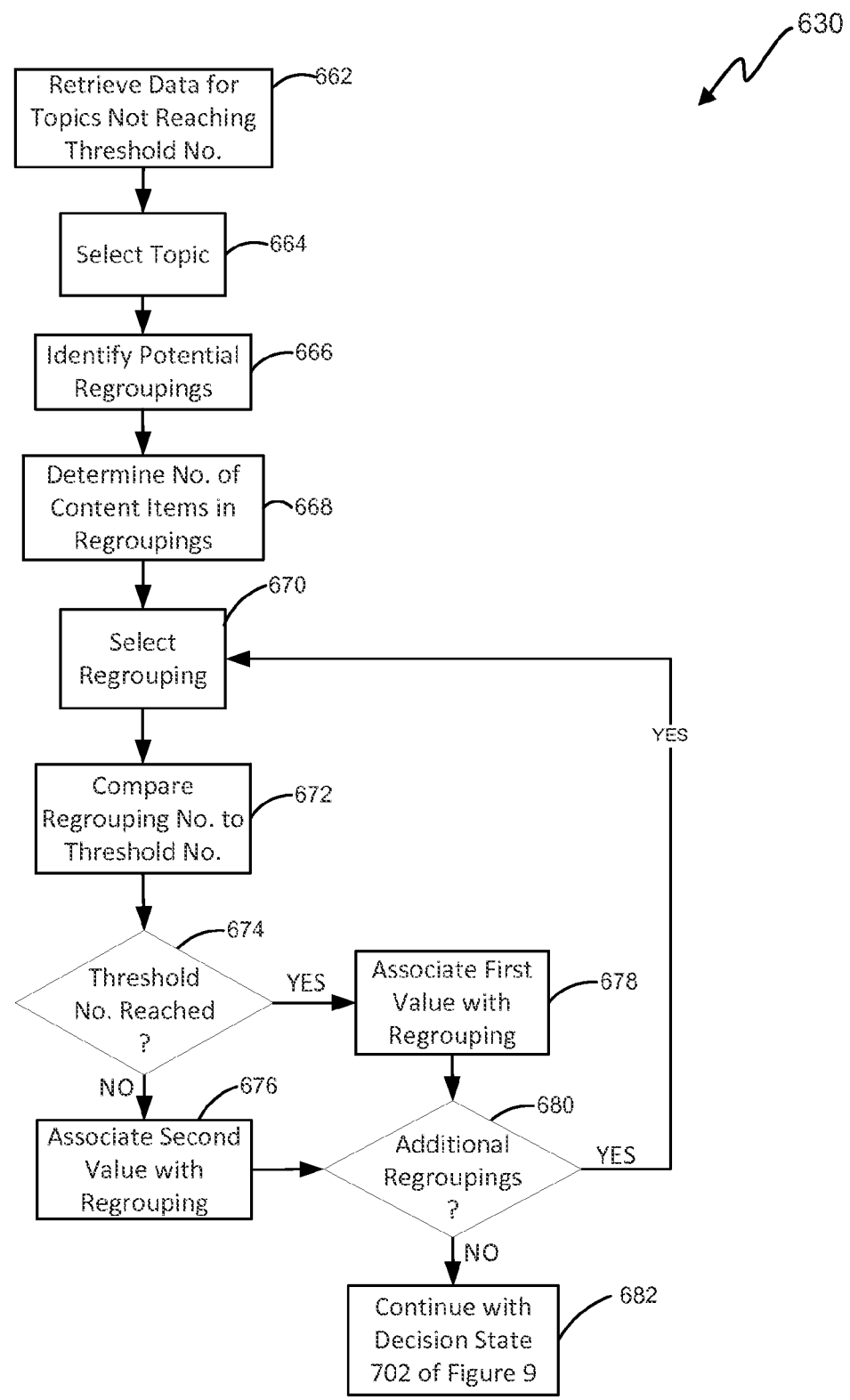
FIG. 8 is a flowchart illustrating a second portion of the process for maximizing data use efficiency.

With reference now to FIG. 8, a flowchart illustrating a second portion of the process 630 for maximizing data use efficiency is shown. The process continues with block 662 wherein data for topics not reaching the threshold number is retrieved. In some embodiments, this data can be retrieved from one of the databases 104 such as, for example, the content library database 303. In some embodiments, for example, this data can indicate the interrelations between the topics not reaching the threshold number and other topics such as, for example, whether topics belong to a common umbrella topic, whether portions of topics overlap, or the like. In some embodiments, this data can further include information identifying the degree to which the topics that did not reach the threshold number failed to reach that threshold number. Specifically, in some embodiments, this data can identify the number of content items that would need to be added to a topic for that topic to meet the threshold number.

After data for topics has been retrieved, the process 630 proceeds to block 664 wherein a topic is selected. In some embodiments, the topic can be selected from the one or several topics that did not meet the threshold number. In some embodiments, a value indicative of selection can be associated with the topic when that topic is selected, and this value indicative of selection can be stored in one of the databases 104 such as the content library database 303.

After one of the topics has been selected, the process 630 proceeds to block 666 wherein one or several potential re-groupings are identified. In some embodiments, these one or several potential re-groupings can identify ways in which the selected topic in the content items can be aggregated with other topics. In some embodiments, the identification of these potential regroupings can be based on the data retrieved in block 662, and specifically can be based on the data indicating the interrelations between topics. In some embodiments, for example, potential regroupings can be formed that include the selected topic as well as one or more other topics belonging to a common umbrella topic and/or containing overlapping content. Information relating to the potential regroupings can be stored in one of the databases 104 such as the content library database 303.

After the potential regroupings have been identified, the process 630 proceeds to block 668 wherein the number of content items in the potential regroupings is identified. In some embodiments, this can include the selection of a potential regrouping, the determination of the number of content items associated with that potential regrouping, and the storing of information identifying the number of content items associated with that potential regrouping. This can be repeated for some or all of the potential regroupings, either serially, in parallel, or partially in parallel.

After the number of content items in the regroupings has been identified, the process 630 proceeds to block 670 wherein one of the potential regroupings is selected. In some embodiments, the regrouping can be selected from the one or potential regroupings identified in block 666. In some embodiments, a value indicative of selection can be associated with the potential regrouping when that potential regrouping is selected, and this value indicative of selection can be stored in one of the databases 104 such as the content library database 303.

After one of the potential regroupings has been selected, the process 630 proceeds to block 672 wherein the number of content items associated with the potential regrouping are compared to the threshold number. This comparison can be performed by, for example, the content management server 102, and this comparison can determine whether the number of content items associated with the potential regrouping are greater than, less than, or equal to the threshold number.

After the number of content items associated with the selected regrouping are compared to the threshold number, the process 630 proceeds to decision state 674, wherein it is determined if the threshold number has been reached. If the threshold has not been reached, then the process 630 proceeds to block 676, wherein a second value such as, for example, a second Boolean value is associated with the selected potential regrouping. In some embodiments, the threshold number has not been reached when the number of content items associated with that selected potential regrouping is less than the threshold number or alternatively is less than or equal to the threshold number. Alternatively, if it is determined that the threshold has been reached, then the process 630 proceeds to block 678, wherein a first value, such as a first Boolean value is associated with the topic. In some embodiments, the threshold number has been reached when the number of content items associated with that selected potential regrouping is greater than the threshold number or alternatively is greater than or equal to the threshold number.

After one of the first or second values has been associated with the selected potential regrouping, the process 630 proceeds to decision state 680 where it is determined if there are additional regroupings, and specifically, wherein it is determined if there are additional potential regroupings that have not yet been evaluated with respect to the threshold number. If it is determined that there are additional, unevaluated potential regroupings, then the process 630 returns to block 670 and proceeds outlined above. Alternatively, if it is determined that there are no additional, unevaluated topics, and the process 630 proceeds to block 682 and continues with decision state 702 of FIG. 9.

Figure 9:
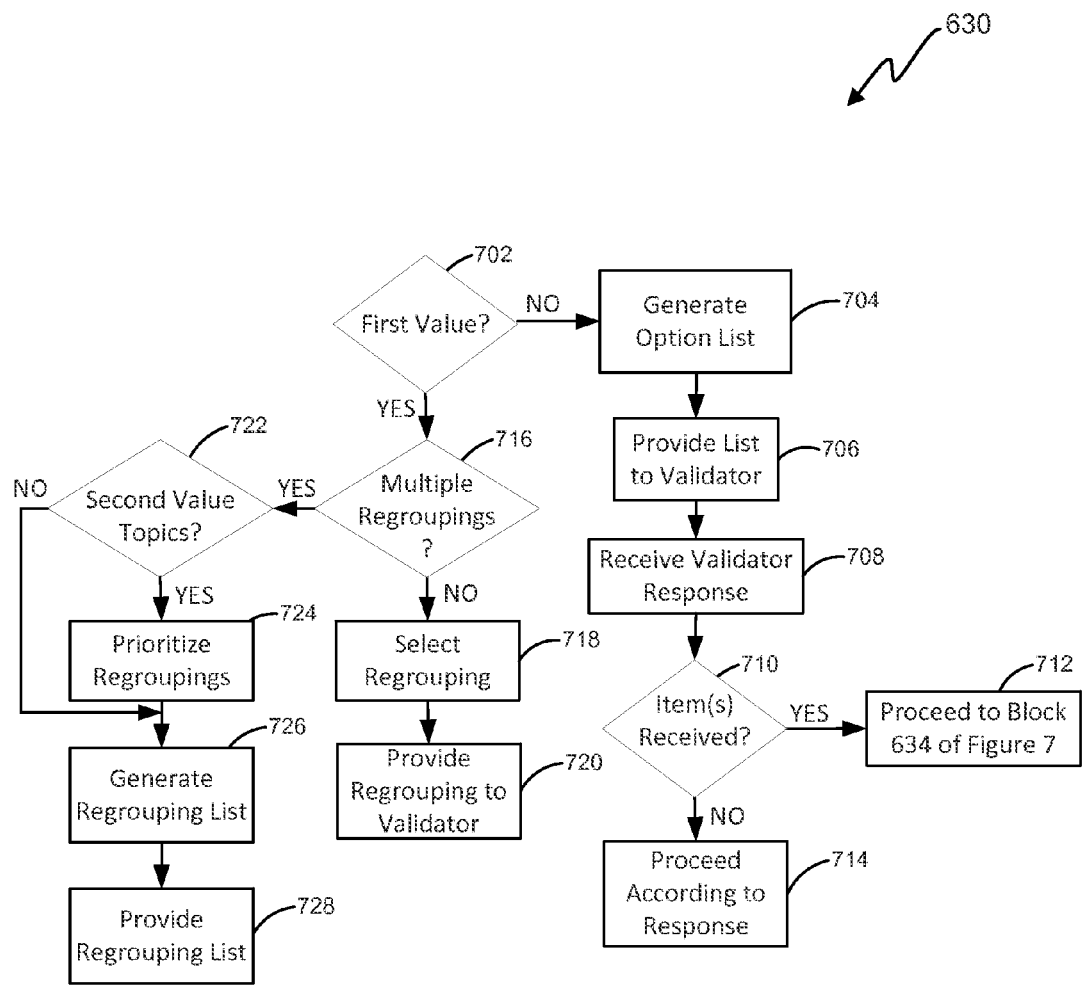
FIG. 9 is a flowchart illustrating a third portion of the process for maximizing data use efficiency.

With reference now to FIG. 9, a flowchart illustrating a third portion of the process 630 for maximizing data use efficiency is shown. The process 630 continues at decision state 702, wherein it is determined if any of the potential regroupings are associated with the first value. In some embodiments, this determination can be made by retrieving values associated with the potential regroupings and blocks 676 and 678 of FIG. 8. If it is determined that the first value is not associated with any of the potential regroupings, then the process 630 proceeds to block 704 wherein an option list is generated. In some embodiments, the option list can identify one or several options that can be selected by the validator to address the insufficient number of content items associated with one or several of the topics. In some embodiments, these options can include, for example, the exclusion of the topic from the validation, a request for the validator to provide one or several content items relevant to the topic, a request for the validator to modify an aspect of the cut threshold, and/or request for permission to identify content items relevant to the topic from third-party or other sources.

After the list(s) is been generated, the process 630 can proceed to block 706 when the option list is provided to the validator. In some embodiments, the option list can be provided to the validator by providing the option list to the user device 106 from the content manager server 102. After the list(s) has been provided to the validator, the process 630 proceeds to block 708 wherein a validator response is received. In some embodiments, the validator response can comprise a data input received in response to the providing of the option list. The validator response can, for example, include one or several content items for association with one or several topics, can include permission to search for and/or retrieve one or several content items from third-party or other sources, can include a modification to the cut threshold, and/or can including instruction to remove a topic from the validation.

After the validator response is received, the process 630 proceeds to decision state 710 where it is determined if one or several content items have been received. If one or several content items have been received, and these items are added to one of the databases 104 such as, for example, the content library database 303, and the process 630 proceeds to block 712 and then proceeds to block 634 of FIG. 7. Returning again to decision state 710, if it is determined that no content items were received in response, than the process 630 proceeds to block 714 and proceeds according to the received response. In some embodiments, this can include, for example, updating the validation to exclude one or several of the topics, changing the cut threshold and re-determining whether topics meet the threshold number, and/or searching for and/or retrieving new content items from third-party or other sources.

Returning again to decision state 702, if it is determined that one or several of the potential regroupings are associated with the first value, then the process 630 proceeds to decision state 716 wherein it is determined if there are multiple potential regroupings. If it is determined that there are not multiple potential regroupings, than the process 630 proceeds to block 718 wherein the potential regrouping is selected in the process 630 then proceeds to block 720 wherein the potential regrouping is provided to the validator. In some embodiments, the potential regrouping can be provided to the validator from the content management server 102 via the user device 106.

In some embodiments, the potential regrouping can be provided to the validator with the request for the validator to indicate whether to accept the potential regrouping. In some embodiments, the providing of the potential regrouping to the validator can further include receiving a response from the validator and determining whether the validator has accepted or denied the request for the potential regrouping. In the event that the validator accepted the potential regrouping, and the process 630 can return to block 632 of FIG. 6 and proceed as outlined above substituting the accepted potential regrouping for the topic. In the event that the validator does not accept the potential regrouping, and the process can proceed to block 704 and proceed as outlined above.

Returning again to decision state 716, if it is determined that there are multiple potential regroupings, the process 630 proceeds to decision state 722 wherein it is determined if one or several of the multiple potential regroupings include more than one topic associated with the second value. In some embodiments, the determination at decision state 722 can facilitate combining multiple topics lacking adequate numbers of content items to thereby efficiently resolve all of the topics associated with the second value.

If it is determined that some of the multiple potential regroupings include more than one topic associated with the second value, then the process 630 proceeds to block 724 wherein the regroupings are prioritized. In some embodiments, the regroupings are prioritized according to the number of topics associated with the second value that are included in a regrouping. After the regroupings have been prioritized, or if it is determined in decision state 722 that none of the regroupings include more than one topic associated with the second value, the process 630 proceeds to block 726 wherein a regrouping list is generated. In some embodiments, the regrouping list can identify the potential regroupings, the topics including the potential regroupings, and recommendations as to the best of the potential regroupings. After the regrouping list has been generated, the process 630 proceeds to block 728 wherein the regrouping list is provided to the validator via, for example, the user device 106 and the content management server 102.

In some embodiments, the regrouping list can be provided to the validator with the request for the validator to indicate which, if any, of the potential regroupings to accept. In some embodiments, the providing of the potential regrouping to the validator can further include receiving a response from the validator and determining which, if any, of the potential regroupings have been accepted by the validator. In the event that the validator accepted one or several of the potential regroupings, the process 630 can return to block 632 of FIG. 6 and proceed as outlined above substituting the accepted potential regrouping for the topic. In the event that the validator does not accept any of the potential regroupings, then the process can proceed to block 704 and proceed as outlined above.

Figure 10:
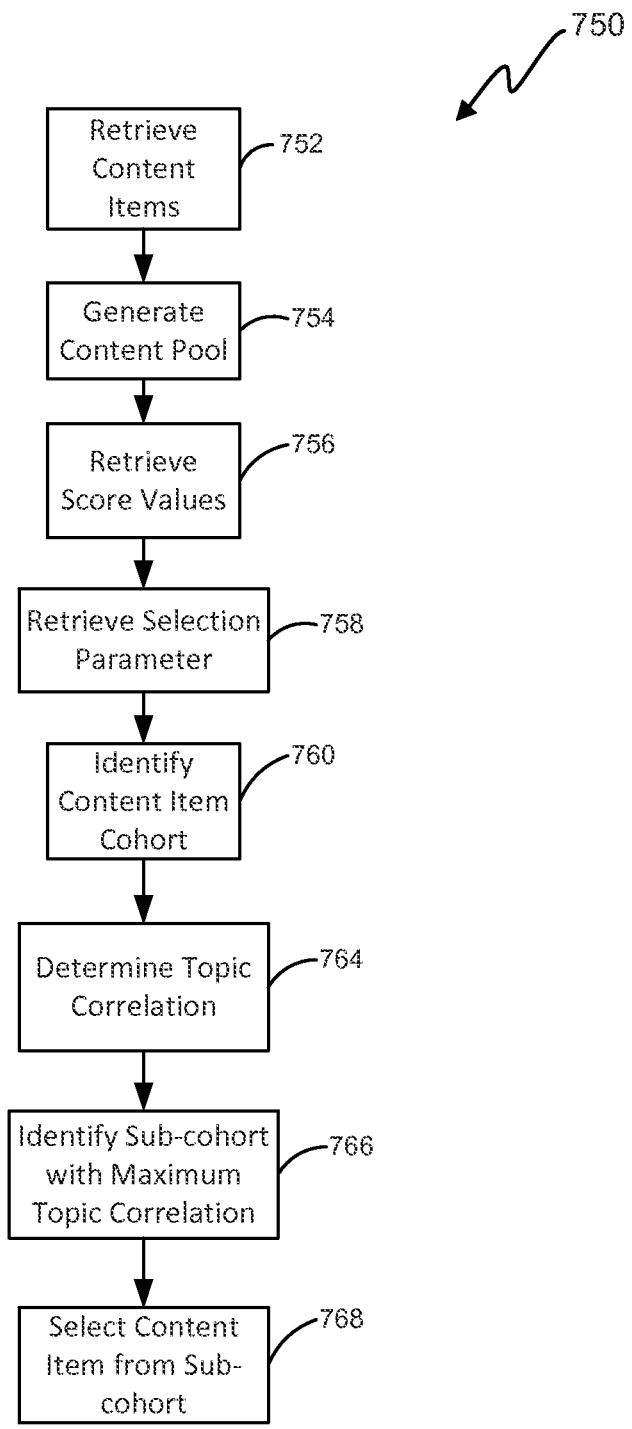
FIG. 10 is a flowchart illustrating one embodiment of a process for maximizing validation efficiency.

With reference now to FIG. 10, a flowchart illustrating one embodiment of a process 750 for maximizing validation efficiency is shown. In some embodiments, the process 750 can be used to identify content items relevant to the greatest number of topics such that a statistically significant number of data points based on participant responses can be collected from the smallest number of provided content items, and specifically to select a first content item for starting a validation. The process 750 can begin at block 752 wherein content items are retrieved. In some embodiments, these content items can be the content items associated with the validation, and these content items can be retrieved from one of the databases 104 such as, for example, the content library database 303.

After the content items have been retrieved, the process 750 proceeds to block 754 wherein a content pool is generated. In some embodiments, the content pool can comprise some or all of the content items associated with the validation. The content pool can be generated by the content management server 102 and can be stored in one of the databases 102 such as, for example, the validating database 308. In some embodiments, and as validation efficiency may be improved if the content pool is quickly accessible, the content pool can be created in a relatively faster tier of memory such as, for example, in the tier 1 memory or in the tier 0 memory.

After the content pool has been generated, the process 750 proceeds to block 756 wherein one or several score values are retrieved. In some embodiments, these one or several score values can identify some attribute of the content items with which they are associated. In some embodiments, this attribute can include, for example, data indicative of a level of the content item, data indicative of the difficulty of the content item, or the like. In some embodiments, the score values can be retrieved from the database 104, and specifically from the content library database 303.

After the score values have been retrieved, the process 750 proceeds to block 758 wherein a selection parameter is retrieved. In some embodiments, the selection parameter can be used to identify one or several cohorts of content items suitable for use as a first content item in a validation. In some embodiments, the selection parameter can define a threshold against which the retrieve score values are compared to determine the suitability of one or several of the content items for use as a first content item in a validation. In one embodiment, for example, the selection parameter can define a difficulty threshold. In such an embodiment, a content item is not suitable for use as a first content item in a validation if the score value of that content item indicates a difficulty greater than the difficulty threshold defined by the selection parameter. In some embodiments, the selection parameter can be received from the validator and/or can be stored in the database 104, and specifically in the validation database 307.

After the selection parameter has been retrieved, the process 750 proceeds to block 760 wherein a content item cohort is identified. In some embodiments, the identification of the content item cohort can comprise selection of one of the retrieved content items, a comparison of the score value of the selected one of the retrieved content items to the selection parameter, associating a first value indicative of the suitability of the selected content item for use as a first question if the comparison of the score value to the selection parameter indicates such suitability or associating a second value indicative of the unsuitability of the selected content item for use as a first question if the comparison of the score value to the selection parameter indicates such unsuitability, and adding the content item to a cohort of suitable content items if the selected content item is associated with the first value. In some embodiments, this identification of the content item cohort can be performed by, for example, the content management server 102.

After the content item cohort has been identified, the process 750 proceeds to block 764 wherein topic correlation is determined. In some embodiments, the determination of content correlation can include identifying topics associated with one or several the content items, and specifically identifying the number of topics associated with some or all of the content items. After the topic correlation has been completed, the process 750 proceeds to block 766 wherein a sub-cohort of content items having the maximum topic correlation is identified. In some embodiments, this sub-cohort can be content items contained in the cohort identified as block 760, but that also have a maximum number of associated topics. In some embodiments, this sub-cohort can be used to identify content items contained within the cohort of block 760 and that are broadly applicable to the topics of the validation. In some embodiments, the selection of such content items can decrease the number of content items required in the validation to reach a statistically significant number. In some embodiments, the sub-cohort can be identified with the content management server 102 and information relating to the sub-cohort can be stored in the database 104, and specifically in the validation database 307.

After the sub-cohort has been identified, the process 750 proceeds to block 768 wherein a content item is selected from the sub-cohort. In some embodiments, the selected content item can be the content item associated with the greatest number of topics, and another embodiments, the selected content item can be randomly selected from the sub-cohort. In some embodiments, the content item can be selected from the sub-cohort by the content management server 102.

Figure 11:
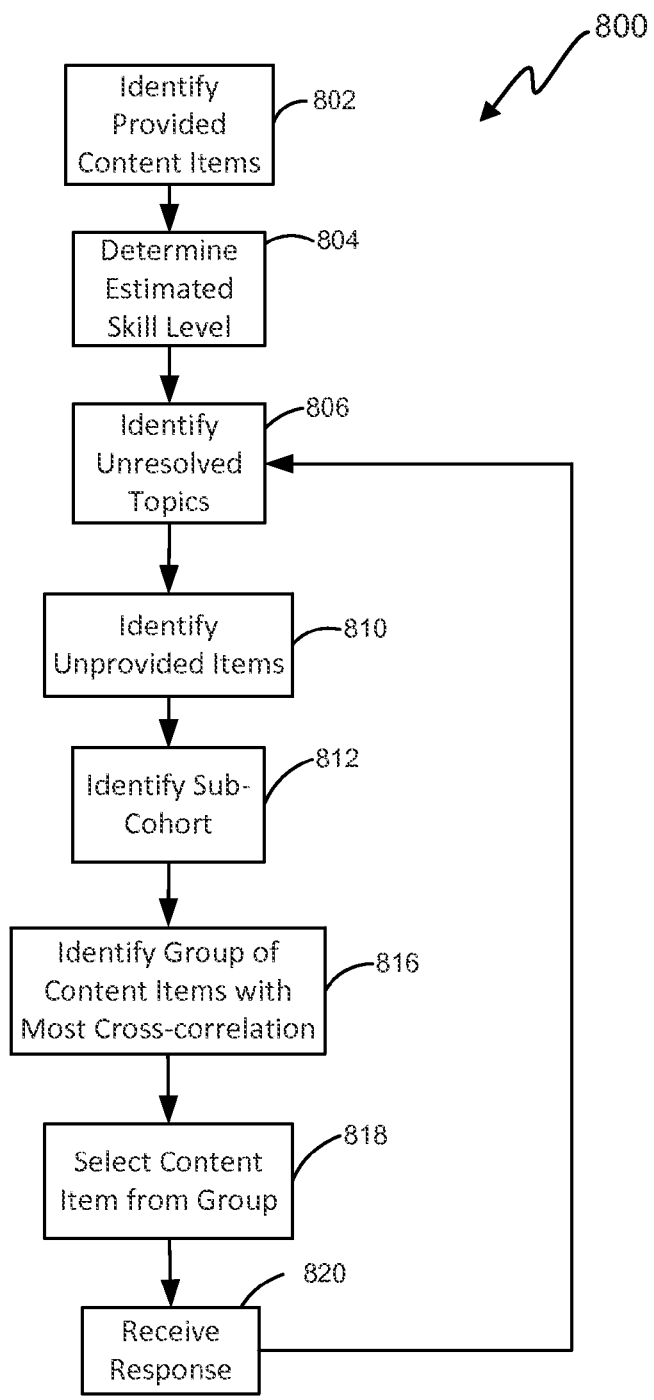
FIG. 11 is a flowchart illustrating one embodiment of a process for selecting further content items for a validation to maximize content item efficiency.

With reference now to FIG. 11, a flowchart illustrating one embodiment of a process 800 for selecting further content items for a validation to maximize content item efficiency is shown. The process 800 begins at block 802 wherein the provided content items identified. In some embodiments, this can include identifying content items associated with topics of a validation. These content items can be identified by retrieving validation information identifying topics from the validation database 307 and identifying content items associated with those topics by querying the content library database 303.

After the content items have been identified, the process 800 proceeds to block 804 the estimated skill level of those content item is determined. In some embodiments this can include retrieving skill level information associated with the content items from the database 104, and specifically from the content library database 303. After the estimated skill level has been determined, the process 800 proceeds to block 806 wherein one or several unresolved topics are identified. In some embodiments, the topic is unresolved when a statistically significant number of content items associated with that topic have not been provided and responded to such that a determination of passage or failure to pass a topic can be made. In some embodiments, unresolved topics can be identified by, for example, the content management server 102.

After the unresolved topics have been identified, the process 800 proceeds to block 810 wherein one or several unprovided content items are identified. In some embodiments, these unprovided content items can be content items that have not yet been provided as part of the validation. In some embodiments, for example, a value indicative of the providing of a content item can be associated with the content item when the content item is provided to a user as part of a validation. In some embodiments, this value can be associated with its content item and stored in one of the databases 104 such as, for example, the validating database 308. In some embodiments, identifying unprovided content items can comprise identifying one or several content items that are not associated with this value.

After the unprovided content items have been identified, the process 800 proceeds to block 812 wherein a topic sub-cohort is identified. In some embodiments, this topic sub-cohort can be the group of content items associated with the greatest number of topics. In some embodiments, identifying this topic sub-cohort can include, for example, determining which of the unprovided content items are relevant to identified unresolved topics, and determining the number of topics associated with each of those unprovided content items. In some embodiments, determining the number of topics, associated with each of those unprovided content items can include determining the number of unresolved topics associated with each of those unprovided content items.

After the topic sub-cohort has been identified, the process 800 proceeds to block 816 wherein a group of content items with the greatest number of cross-correlation is identified out of the set of content items belonging to the sub-cohort. In some embodiments, identifying this group of content items can including determining which of the content items in the sub-cohort are relevant to the greatest number of unresolved topics. In some embodiments, a value indicative of either a topic's belonging to the group or not belong to the group can be associated with the topic and stored in one of the databases 104 such as the validating database 308.

After the grip of content items has been identified, the process 800 proceeds to block 818 wherein a content item is selected from the group. In some embodiments, the selected content item can be the content item associated with the greatest number of topics, and in other embodiments, the selected content item can be randomly selected from the group. In some embodiments, the content item can be selected from the group by the content management server 102. After the content item has been selected, the process 800 can proceed to 820 wherein a response is received. In some embodiments receiving the response can include providing the selected content item to the participant via, for example, the user device 106 and receiving a response from the participant via the user device 106 in response to that content item. In some embodiments, after the response has been received, the process can return to block 806 and proceed as outlined above.

Figure 12:
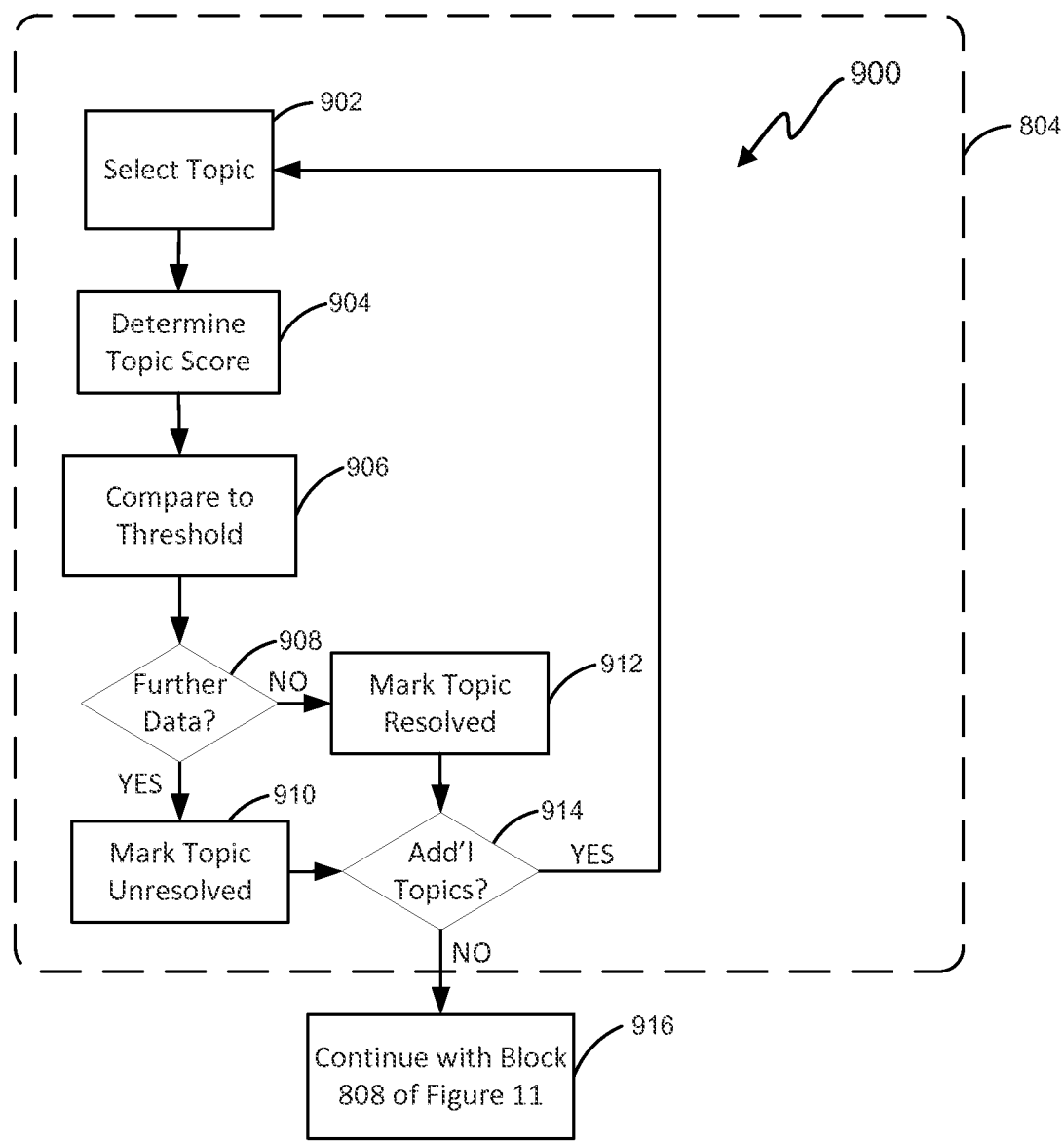
FIG. 12 is a flowchart illustrating one embodiment of a process for identifying unresolved topics.

With reference now to FIG. 12, a flowchart illustrating one embodiment of a process 900 for identifying unresolved topics is shown. In some embodiments, the process 900 can be performed in the place of, or as a part of step 806 of the process 800 shown in FIG. 11. The process begins at block 902 wherein a topic is selected. After the topic is selected, the process 900 proceeds to block 904 for wherein a topic score is determined. In some embodiments this can include generating a score such as one IRT score for a topic based on responses received from one or several content items associated with that topic. This topic score can be determined by the content management server 102 or other processing component of the content delivery network 100 such as, for example, one or several user devices 106, one or several supervisor devices 110, or the like.

After the topic score has been determined, the process 900 proceeds to block 906 wherein the topic score is compared to a threshold, and specifically wherein the topic score is compared to the cut threshold. In some embodiments, step 906 can further include retrieving the cut threshold from, for example, the validation database 307. The topic score can be compared to the cut threshold by the content management server 102 or other processing component of the content delivery network 100 such as, for example, one or several user devices 106, one or several supervisor devices 110, or the like.

After the topic scores are compared to the cut threshold, the process 900 proceeds a decision state 908 wherein it is determined if further data, and specifically a further response to content items are required to determine whether the topic score reaches the cut threshold. If it is determined that further data is required, then the process proceeds to block 910 wherein the topic is marked as unresolved. In some embodiments, the topic can be marked as unresolved in one of the databases 104 such as the validating database 308. Returning again to decision state 908, if it is determined that further data is not required, then the process 900 proceeds to block 912 wherein the topic is marked as resolved. In some embodiments, the topic can be marked as resolved in one of the databases 104 such as the validating database 308.

After the topic has been marked as resolved or unresolved, the process 900 proceeds to a decision state 914 wherein it is determined if there are additional topics to be evaluated to determine their resolved/unresolved status. If there are additional topics, then the process 900 returns to block 902 and proceeds outlined above. If there are no additional topics needing evaluation to determine whether they are resolved or unresolved, then the process 900 proceeds to block 916 and continues with block 808 of FIG. 11.

Figure 13:
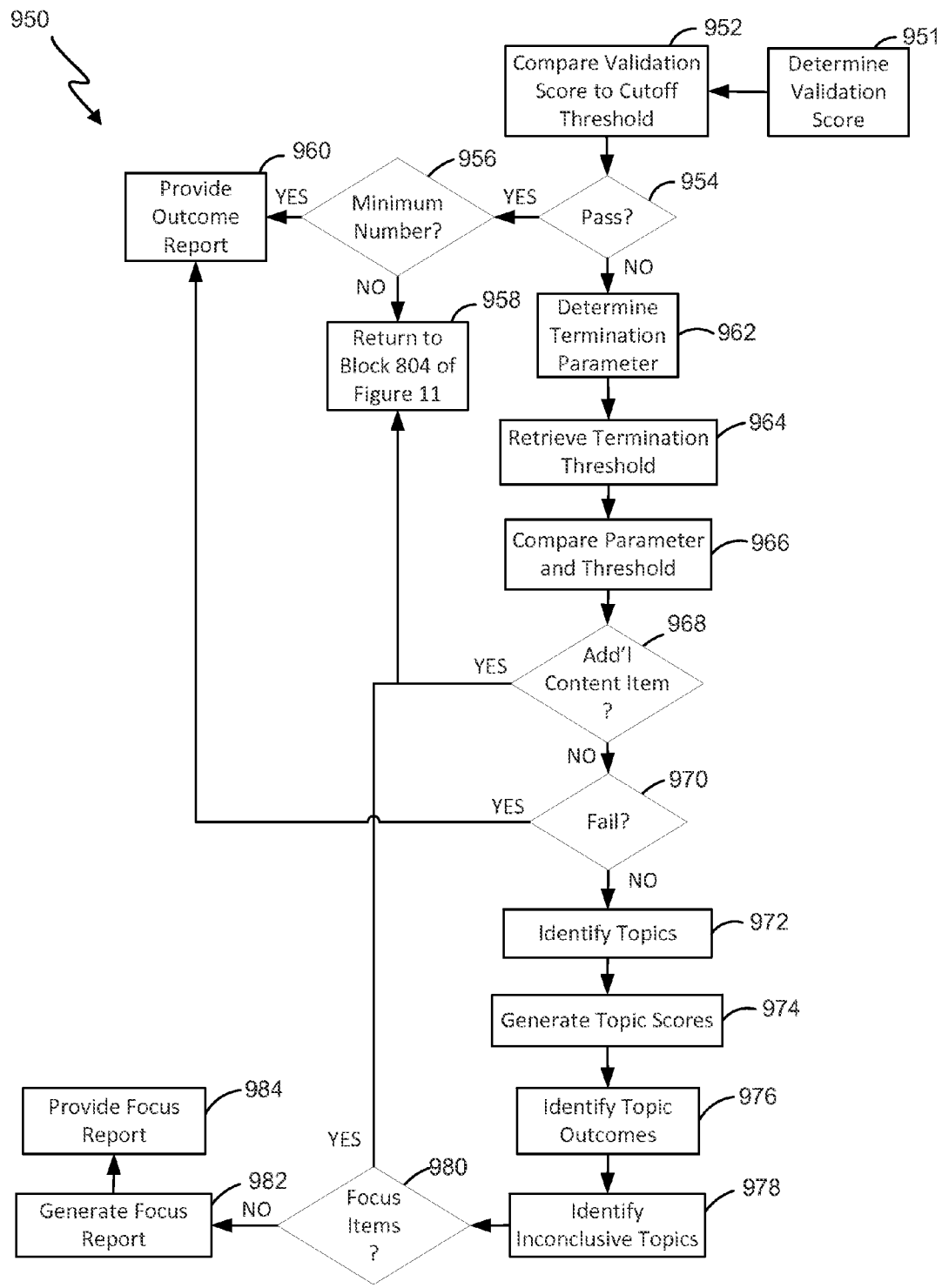
FIG. 13 is a flowchart illustrating one embodiment of a process for determining completeness of a validation.

With reference now to FIG. 13, a flowchart illustrating one embodiment of a process 950 for determining completeness of a validation is shown. The process begins at block 951 wherein an initial validation score is determined. In some embodiments, this initial validation score can be based on responses received from the participant to one or several provided content items. After the initial validation score has been determined, the process 950 proceeds to block 952 wherein the validation score is compared to the cutoff threshold. In some embodiments, this can include retrieving the cut threshold from one of the databases 104 such as the validation database 307 and comparing the validation score to the cut threshold.

After the validation score has been compared to the cut threshold, the process 950 proceeds to decision state 954 wherein it is determined whether the comparison of the validation score to the cut threshold is indicative of the participant passing the validation. If the comparison of the validation score to the cut threshold is indicative of the participant passing the validation, then the process 950 proceeds to decision state 956 wherein it is determined if a minimum number of content items has been provided. In some embodiments, this can include determining whether the validation score is based on a statistically significant number of responses provided to content items and/or determining whether the number of responses provided to content items is adequate to meet the confidence requirements of the cut threshold. If it is determined that the minimum number of content items has not been provided, then the process 950 proceeds to block 958 and returns to block 804 of FIG. 11. Returning again to decision state 956, if it is determined that the minimum number of content items has been provided, than the process 950 proceeds to block 960 wherein an outcome report is generated and/or provided. In some embodiments, the outcome report can include information outlining the performance of the participant on the validation which can identify, for example, content items provided to the participant, responses received from the participant, number of correct responses received from the participant, number of incorrect responses received from the participant, content items receiving correct responses, content items receiving incorrect responses, or the like. In some embodiments, the outcome report can be provided to the participant via the user device 106 and/or can be provided to, for example, the validator or other individual responsible for the participants performance via, for example, one of the user devices 106 and/or the supervisor device 110.

Returning again to decision state 954 if it is determined that the comparison of the validation score to be cut threshold is not indicative of the participant passing the validation, then the process 950 proceeds to block 962 wherein a termination parameter is determined. In some embodiments, for example, the termination parameter can be one or several values associated with the participant's validation and that can be used to determine when to terminate a validation apart from determining that the participant has passed the validation. In some embodiments, the termination parameter can include, for example, the number of content items provided to the participant, the number of content items responded to by the participant, the amount of time used by the participant in the validation, or the like.

After the termination parameter has been determined, the process 950 proceeds to block 964 wherein termination threshold is retrieved. In some embodiments, the termination threshold can delineate between circumstances in which the validation should be terminated and circumstances in which the validation should not be terminated, apart from instances in which it is determined that the participant has passed the validation. The termination threshold can be retrieved from one of the databases 104, and can be specifically retrieved from the validation database 307.

After the termination threshold has been retrieved, the process 950 proceeds to block 966 wherein the termination parameter is compared to the termination threshold. In some embodiments, this comparison can determine whether the termination parameter exceeds, meets, or does not exceed the termination threshold. After the termination parameter has been compared to the termination threshold, the process 950 proceeds a decision state 968 wherein it is determined if an additional content item may be provided. In some embodiments, this determination can be based on whether the termination parameter meets or exceeds the termination threshold. In some embodiments, and in the event the termination parameter meets the termination threshold, additional content items cannot be provided. If it is determined that an additional content item can be provided such as when the termination parameter does not meet or exceed the termination threshold, then the process 950 can return to block 958 and proceed at block 804 of FIG. 11.

Returning again to decision state 968 if it is determined that an additional content item cannot be provided, then the process 950 proceeds a decision state 970 wherein it is determined whether the participant failed validation. In some embodiments, the determination of the failure of the validation can distinguish between circumstances in which the participant's responses to the content items indicate failure to pass the validation versus circumstances in which the participant's responses to the content items neither indicate passage of the validation nor failure to pass the validation. In some embodiments, this inconclusive circumstance can arise due to insufficient number of responses being received such that the confidence level specified by the cut threshold is not achieved. If it is determined that the participant failed validation, then the process 950 can proceed to block 960 wherein the outcome report is generated and/or provided. In such an embodiment, the validation report can indicate the reasons for failure to pass the validation, and can, in some embodiments, provide one or several remedial actions to improve validation performance.

Returning again to decision state 970 if it is determined that the participant did not fail to pass the validation, then the process 950 proceeds to block 972 wherein the topics of the validation are identified. In some embodiments, this can include retrieving validation information from, for example, the validation database 307. After the topics of been identified, the process 950 proceeds to block 974 wherein topics scores for the identified topics are generated. In some embodiments, these topics scores can be generated by selecting a topic, identifying content items and responses associated with the selected topic, and determining the score based on the number of correct and/or incorrect responses received for the content items associated with the topic. This can be repeated until topics course have been generated for some or all of the topics of the validation.

After the topics scores have been generated, the process 950 proceeds to block 976 wherein one or several topic outcomes are identified. In some embodiments, this can include identifying passed, failed, or inconclusive topics in the validation. This identification can be made by comparing the topics scores generated in block 974 to the cut threshold. After the topic outcomes have been identified, the process 950 proceeds to block 978 wherein inconclusive topics are identified. In some embodiments, these inconclusive topics can be topics for which the responses received to provide content items indicate neither passage nor failure of the topic.

After the inconclusive topics have been identified, the process 950 proceeds to block 980 wherein it is determined if additional focus items may be provided to the participant. In some embodiments, focus items can be one or several content items directed to inconclusive topics. If it is determined that focus items can be provided, then the process 950 returns to block 958 and proceeds to block 804 of FIG. 11.

Returning again to decision state 980, if it is determined that focus items cannot be provided, the process 950 proceeds to block 982 wherein a focus report is generated. In some embodiments, the focus report can identify passed topics, failed topics, and inconclusive topics. In some embodiments, the focus report can further identify one or several remedial actions and/or recommendations based on the passed, failed, and/or inconclusive topics. In some embodiments, this recommendation can include, for example, a recommendation for re-taking of the validation, for placement in a remedial group, or the like. After the focus report has been generated, the process 950 proceeds to block 984 wherein the focus report is provided. In some embodiments, the focus report can be provided to the participant and/or validator via one or several user devices 106 and/or one or several supervisor devices 110.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for maximizing data utility efficiency to maximize dynamic application of content in a database as applied to a validation, the system comprising: a memory comprising:

a first database containing information identifying a plurality of topics;

a second database containing a plurality of content items, wherein each content item of the content items is associated with at least one of a plurality of topics, and wherein at least some of the content items are associated with at least two of the plurality of topics; and a server computer configured to:

receive an identification of a number of topics for grouping in the validation from a user device via a network;

determine a number of content items associated with each topic of at least some of the topics, wherein the determining the number of content items comprises querying the second database for information associating one or several content items with the at least some of the topics;

receive a cut threshold from the user device, wherein the cut threshold comprises data identifying a minimum score and a minimum confidence interval for determining passage with respect to the validation;

determine a threshold number, wherein the threshold number identifies the minimum number of content items per topic for determining when the cut threshold is achieved;

select a first one of the at least some of the topics;

compare the number of content items associated with the first one of the at least some of the topics to the threshold number, wherein the comparing the number of content items associated with the first one of the at least some of the topics to the threshold number comprises associating a first value with the first one of the at least some of the topics when the number of content items is greater than the threshold number and associating a second value with the first one of the at least some topics when the number of content items is less than the threshold number;

associate remedial content with the selected first one of the at least some of the topics when the second value is associated with the first one of the at least some of the topics;

generate, based on the comparing the number of content items and the determined threshold number, a validation report that identifies one or several remedial actions and recommendations based on passed, failed, or inconclusive topics to improve validation performance; and provide the validation report to a validator via the user device or one or several supervisor devices.

2. The system of claim 1, wherein the server computer is further configured to iteratively select an additional topic of the at least some of the topics and compare the number of content items associated with the additional topic to the threshold number until the number of content items associated with each topic of the at least some of the topics has been compared to the threshold number.

3. The system of claim 2, wherein associating remedial content with the selected first one of the at least some of the topics comprises: identifying topics of the at least some of the topics that are associated with the second value; iteratively selecting a topic from the identified topics of the at least some of the topics that are associated with the second value and identifying at least one potential regroupings for the iteratively selected topic from the identified topics of the at least some of the topics that are associated with the second value; and regrouping the iteratively selected topic from the identified topics with one of the at least one potential regroupings.

4. The system of claim 3, wherein regrouping the iteratively selected topic from the identified topics with at least some of identified potential regrouping topics comprises: determining that the at least one potential regroupings comprises a plurality of regroupings; and iteratively comparing the number of content items associated with one regrouping of the at least one potential regroupings with the threshold number until the number of content items associated with each potential regrouping of the at least one potential regroupings has been compared to the threshold number, wherein comparing the number of content items associated with one regrouping to the threshold number comprises associating a first value with the one regrouping when the number of content items associated with the one regrouping is greater than the threshold number and associating a second value with the one regrouping when the number of content items associated with the one regrouping is less than the threshold number.

5. The system of claim 4, wherein regrouping the iteratively selected topic from the identified topics with at least some of the identified potential regrouping topics further comprises: determining that one of the potential regroupings is associated with the first value; selecting the one of the potential regroupings that is associated with the first value; and providing the selected one of the potential regroupings to the user device.

6. The system of claim 4, wherein regrouping the iteratively selected topic from the identified topics with at least some of the identified potential regrouping topics further comprises: determining that more than one of the potential regroupings is associated with the first value; identifying at least one of the more than one of the potential regroupings that includes at least one topic associated with the second value; and providing the at least one of the more than one of the potential regroupings that includes at least one topic associated with the second value to the user device.

7. The system of claim 4, wherein regrouping the iteratively selected topic from the identified topics with at least some of the identified potential regrouping topics further comprises: determining that none of the potential regroupings is associated with the first value; generating an option list, wherein the option list identifies at least one of: a change to the validation; potential source of a new content item; and a request for new content items; and providing the option list to the user device.

8. The system of claim 7, wherein the server computer is further configured to: receive a new content item from the user device; and identify topics associated with the new content item.

9. The system of claim 7, further comprising a formatting server computer configured to receive a content item from the potential source and convert a format of the content item to a desired format.

10. A method for maximizing data utility efficiency to maximize dynamic application of content in a database as applied to a validation; the method comprising:
receiving, by a server computer, an identification of a number of topics for grouping in the validation from a user device via network;
retrieving, by the server computer, information from a first database in a memory, wherein the information identifies content items associated with each topic of at least some of the number of topics, wherein the content items are stored in a second database in the memory;
determining, by the server computer, a number of content items associated with said each topic of at least some of the topics, wherein the determining the number of content items comprises querying the second database for information associating one or several content items with the at least some of the topics;
receiving, by the server computer, a cut threshold from the user device, wherein the cut threshold comprises data identifying a minimum score and a minimum confidence interval for determining successful completion of the validation;
determining, by the server computer, a threshold number, wherein the threshold number identifies a minimum number of content items per topic for determining when the cut threshold is achieved;
selecting, by the server computer, a first one of the at least some of the topics;
comparing, by the server computer, the number of content items associated with the first one of the at least some of the topics to the threshold number, wherein the comparing the number of content items associated with the first one of the at least some of the topics to the threshold number comprises associating a first value with the first one of the at least some of the topics when the number of content items is greater than the threshold number and associating a second value with the first one of the at least some topics when the number of content items is less than the threshold number;
associating, by the server computer, remedial content with the selected first one of the at least some of the topics when the second value is associated with the first one of the at least some of the topics;
generating, by the server computer, based on the comparing the number of content items and the determined threshold number, a validation report that identifies one or several remedial actions and recommendations based on passed, failed, or inconclusive topics to improve validation performance; and
providing, by the server computer, the validation report to a validator via the user device or one or several supervisor devices.

11. The method of claim 10, further comprising iteratively selecting an additional topic of the at least some of the topics and comparing the number of content items associated with the additional topic to the threshold number until the number of content items associated with each topic of the at least some of the topics has been compared to the threshold number.

12. The method of claim 11, wherein associating remedial content with the selected first one of the at least some of the topics comprises: identifying topics of the at least some of the topics that are associated with the second value; iteratively selecting a topic from the identified topics of the at least some of the topics that are associated with the second value and identifying at least one potential regroupings for the iteratively selected topic from the identified topics of the at least some of the topics that are associated with the second value; and regrouping the iteratively selected topic from the identified topics with one of the at least one potential regroupings.

13. The method of claim 12, wherein regrouping the iteratively selected topic from the identified topics with at least some of the identified potential regrouping topics comprises: determining that the at least one potential regroupings comprises a plurality of regroupings; and iteratively comparing the number of content items associated with one regrouping of the at least one potential regroupings with the threshold number until the number of content items associated with each potential regrouping of the at least one potential regroupings has been compared to the threshold number, wherein comparing the number of content items associated with one regrouping to the threshold number comprises associating a first value with the one regrouping when the number of content items associated with the one regrouping is greater than the threshold number and associating a second value with the one regrouping when the number of content items associated with the one regrouping is less than the threshold number.

14. The method of claim 13, wherein regrouping the iteratively selected topic from the identified topics with at least some of the identified potential regrouping topics further comprises: determining that one of the potential regroupings is associated with the first value; selecting the one of the potential regroupings that is associated with the first value; and providing selected one of the potential regroupings to the user device.

15. The method of claim 13, wherein regrouping the iteratively selected topic from the identified topics with at least some of the identified potential regrouping topics further comprises: determining that more than one of the potential regroupings is associated with the first value; identifying at least one of the more than one of the potential regroupings that includes at least one topic associated with the second value; and providing the at least one of the more than one of the potential regroupings that includes at least one topic associated with the second value to the user device.

16. The method of claim 13, wherein regrouping the iteratively selected topic from the identified topics with at least some of the identified potential regrouping topics further comprises: determining that none of the potential regroupings is associated with the first value; generating an option list, wherein the option list identifies at least one of: a change to the validation; potential source of a new content item; and a request for new content items; and providing the option list to the user device.

17. The method of claim 16, further comprising: receiving a new content item from the user device; and identifying topics associated with the new content item.

18. The method of claim 16, further comprising a formatting server configured to receive a content item from the potential source and convert a format of the content item to a desired format.

* * * * *